(12) United States Patent
Voigt

(10) Patent No.: US 10,877,922 B2
(45) Date of Patent: *Dec. 29, 2020

(54) FLUSHES BASED ON INTENT LOG ENTRY STATES

(71) Applicant: Hewlett Packard Enterprise Development LP, Houston, TX (US)

(72) Inventor: Douglas L. Voigt, Boise, ID (US)

(73) Assignee: Hewlett Packard Enterprise Development LP, Houston, TX (US)

(*) Notice: Subject to any disclaimer, the term of this patent is extended or adjusted under 35 U.S.C. 154(b) by 75 days.

This patent is subject to a terminal disclaimer.

(21) Appl. No.: 16/072,433

(22) PCT Filed: Jan. 29, 2016

(86) PCT No.: PCT/US2016/015677
§ 371 (c)(1),
(2) Date: Jul. 24, 2018

(87) PCT Pub. No.: WO2017/131751
PCT Pub. Date: Aug. 3, 2017

(65) Prior Publication Data
US 2019/0065433 A1 Feb. 28, 2019

(51) Int. Cl.
*G06F 15/173* (2006.01)
*G06F 12/02* (2006.01)
(Continued)

(52) U.S. Cl.
CPC ........ *G06F 15/17331* (2013.01); *G06F 3/061* (2013.01); *G06F 3/064* (2013.01);
(Continued)

(58) Field of Classification Search
CPC .. G06F 15/17331; G06F 3/061; G06F 3/0619; G06F 3/064; G06F 3/067;
(Continued)

(56) References Cited

U.S. PATENT DOCUMENTS 8,719,540 B1 5/2014 Miller et al.
9,058,116 B2 6/2015 Colgrove et al.
(Continued)

FOREIGN PATENT DOCUMENTS

CN 101980137 A 2/2011
CN 103026346 A 4/2013
(Continued)

OTHER PUBLICATIONS

Office Action received for European Patent Application No. 16888478.1, dated Nov. 23, 2018, 11 pages.
(Continued)

*Primary Examiner* — Uzma Alam
(74) *Attorney, Agent, or Firm* — Hewlett Packard Enterprise Patent Department

(57) ABSTRACT

Examples disclosed herein relate to a storage appliance using an optimistic allocation of storage space. In an example system, a number of storage drives are coupled to a storage controller and an RNIC (remote direct memory access (RDMA) network interface card (NIC)) through a storage network. The RNIC includes a layout template selector and a number of templates. The layout template selector selects a template based, at least in part, on a logical block address (LBA) received from a host. The template identifies each of a plurality of storage drives in the plurality of storage drives associated with portions of data represented by the LBA. A slave drive in the number of storage drives includes a state indicator that indicates the status of a transaction. A master drive in the number of storage drives also includes the state indicator to indicate the status of the transaction.

19 Claims, 23 Drawing Sheets

(51) Int. Cl.
  *G06F 12/10* (2016.01)
  *G06F 3/06* (2006.01)
  *H04L 29/08* (2006.01)
  *G06F 11/10* (2006.01)
(52) U.S. Cl.
  CPC ............ *G06F 3/067* (2013.01); *G06F 3/0619* (2013.01); *G06F 3/0688* (2013.01); *G06F 11/1004* (2013.01); *G06F 12/0246* (2013.01); *G06F 12/10* (2013.01); *H04L 67/1097* (2013.01); *G06F 2212/1032* (2013.01); *G06F 2212/1044* (2013.01); *G06F 2212/657* (2013.01); *G06F 2212/7208* (2013.01)
(58) Field of Classification Search
  CPC ............... G06F 3/0688; G06F 11/1004; G06F 12/0246; G06F 12/10; H04L 67/1097
  See application file for complete search history.

(56) References Cited

U.S. PATENT DOCUMENTS

| | | | |
|---|---|---|---|
| 9,158,540 | B1 | 10/2015 | Tzelnic et al. |
| 9,256,527 | B2 | 2/2016 | Bux et al. |
| 2002/0095532 | A1 | 7/2002 | Surugucchi et al. |
| 2003/0149756 | A1 | 8/2003 | Grieve et al. |
| 2005/0240941 | A1 | 10/2005 | Hufferd et al. |
| 2009/0064163 | A1 | 3/2009 | Boyd et al. |
| 2010/0146068 | A1 | 6/2010 | Haviv |
| 2010/0211737 | A1 | 8/2010 | Flynn et al. |
| 2012/0011340 | A1 | 1/2012 | Flynn et al. |
| 2012/0079189 | A1 | 3/2012 | Colgrove et al. |
| 2013/0073747 | A1 | 3/2013 | Klughart |
| 2013/0086303 | A1* | 4/2013 | Ludwig .................. G06F 21/79 711/103 |
| 2013/0132770 | A1* | 5/2013 | Guan .................. G06F 11/2094 714/6.22 |
| 2013/0138758 | A1 | 5/2013 | Cohen et al. |
| 2013/0290608 | A1 | 10/2013 | Nelogal et al. |
| 2014/0208024 | A1 | 7/2014 | Simionescu et al. |
| 2014/0215127 | A1* | 7/2014 | Perrin .................. G06F 16/1734 711/103 |
| 2015/0012735 | A1 | 1/2015 | Tamir et al. |
| 2015/0095555 | A1 | 4/2015 | Asnaashari et al. |
| 2015/0095697 | A1 | 4/2015 | Bonwick |
| 2015/0193338 | A1 | 7/2015 | Sundaram et al. |
| 2015/0212936 | A1* | 7/2015 | Flynn .................. G06F 9/30043 711/103 |
| 2015/0242133 | A1 | 8/2015 | Smith et al. |
| 2015/0254003 | A1 | 9/2015 | Lee et al. |
| 2015/0261434 | A1 | 9/2015 | Kagan et al. |
| 2015/0261720 | A1 | 9/2015 | Kagan et al. |

FOREIGN PATENT DOCUMENTS

| | | |
|---|---|---|
| CN | 203636181 A | 3/2014 |
| CN | 103703450 A | 4/2014 |
| EP | 3286631 A1 | 2/2018 |
| WO | WO-2012014140 A2 * | 2/2012 ......... G06F 12/0246 |
| WO | WO-2013109640 A1 | 7/2013 |
| WO | 2017/131749 A1 | 8/2017 |

OTHER PUBLICATIONS

International Search Report and Written Opinion received for PCT Patent Application No. PCT/US16/15677, dated Oct. 17, 2016, 9 pages.
International Preliminary Report on Patentability received for PCT Patent Application No. PCT/US16/15678, dated Aug. 9, 2018, 10 pages.
International Preliminary Report on Patentability received for PCT Patent Application No. PCT/US16/15677, dated Aug. 9, 2018, 8 pages.
International Preliminary Report on Patentability received for PCT Patent Application No. PCT/US16/15668, dated Aug. 9, 2018, 8 pages.
European Search Report and Search Opinion Received for EP Application No. 16888481.5, dated Nov. 22, 2018, 13 pages.
International Search Report & Written Opinion received in PCT Application No. PCT/US2016/015668, dated Oct. 25, 2016, 11 pages.
International Search Report & Written Opinion received in PCT Application No. PCT/US2016/015678, dated Oct. 14, 2016, 13 pages.
Ren, Y. et al., "Design and Testbed Evaluation of RDMA-based Middleware, for High-performance Data Transfer Applications," (Research Paper), May 9, 2013, 37 pages, available at http://www.ece.sunysb.edu/~tom/paper3-jss.pdf.
Ren, Y. et al., "Protocols for Wide-Area Data-intensive Applications: Design and Performance Issues," (Research Paper), Nov. 10-16, 2012, 11 pages, available at https://ieeexplore.ieee.org/document/6468498.
Small, M., "Optimizing MPI Point-to-point Communication Performance on RDMA-enabled SMP-CMP Clusters," (Research Paper), Nov. 5, 2012, 105 pages, available at http://diginole.lib.fsu.edu/cgi/viewcontent.cgi?article=6919&context=etd.
European Patent Office, "Extended European Search Report," dated Apr. 30, 2018, issued in EP Application No. 16888478.1.
Extended European Search Report received in EP Application No. 16888480.7, dated Dec. 13, 2018, 7 pages.
A. Jesin et al., "How is LSI FastPath different from Software RAID?", available online at <https://web.archive.org/web/20151217230649/https://serverfault.com/questions/732890/how-is-lsi-fastpath-different-from-software-raid>, Oct. 2015, 2 pages.
Compaq Computer Corporation, "The Compaq Enterprise Network Storage Architecture: An Overview," Doc. # 12L8-0500A-WWEN, May 2000, 22 pages.
Jon William Toigo, "Virtualization: Still a Dirty Word?," 2003, The Holy Grail of Network Storage Management, Ch. 7, pp. 102-122.
LSI Corporation, "LSI™ MegaRAID® FastPath™ Software FAQ," available online at <https://docs.broadcom.com/doc/12350217>, Apr. 2010, 2 pages.

* cited by examiner

500

1100

US 10,877,922 B2

FLUSHES BASED ON INTENT LOG ENTRY STATES

BACKGROUND

Data storage requirements and speed requirements are both increasing. Accordingly, new storage technologies have been placed into use which may increase the speed of data access. These storage technologies are often based on non-volatile memory (NVM) that is in the form of solid state drives (SSDs). The SSDs may be interconnected with each other and with hosts, e.g., server systems, through connection technologies that are termed fabrics.

DESCRIPTION OF THE DRAWINGS

Certain exemplary embodiments are described in the following detailed description and in reference to the drawings; in which.

DETAILED DESCRIPTION

Figure 1:
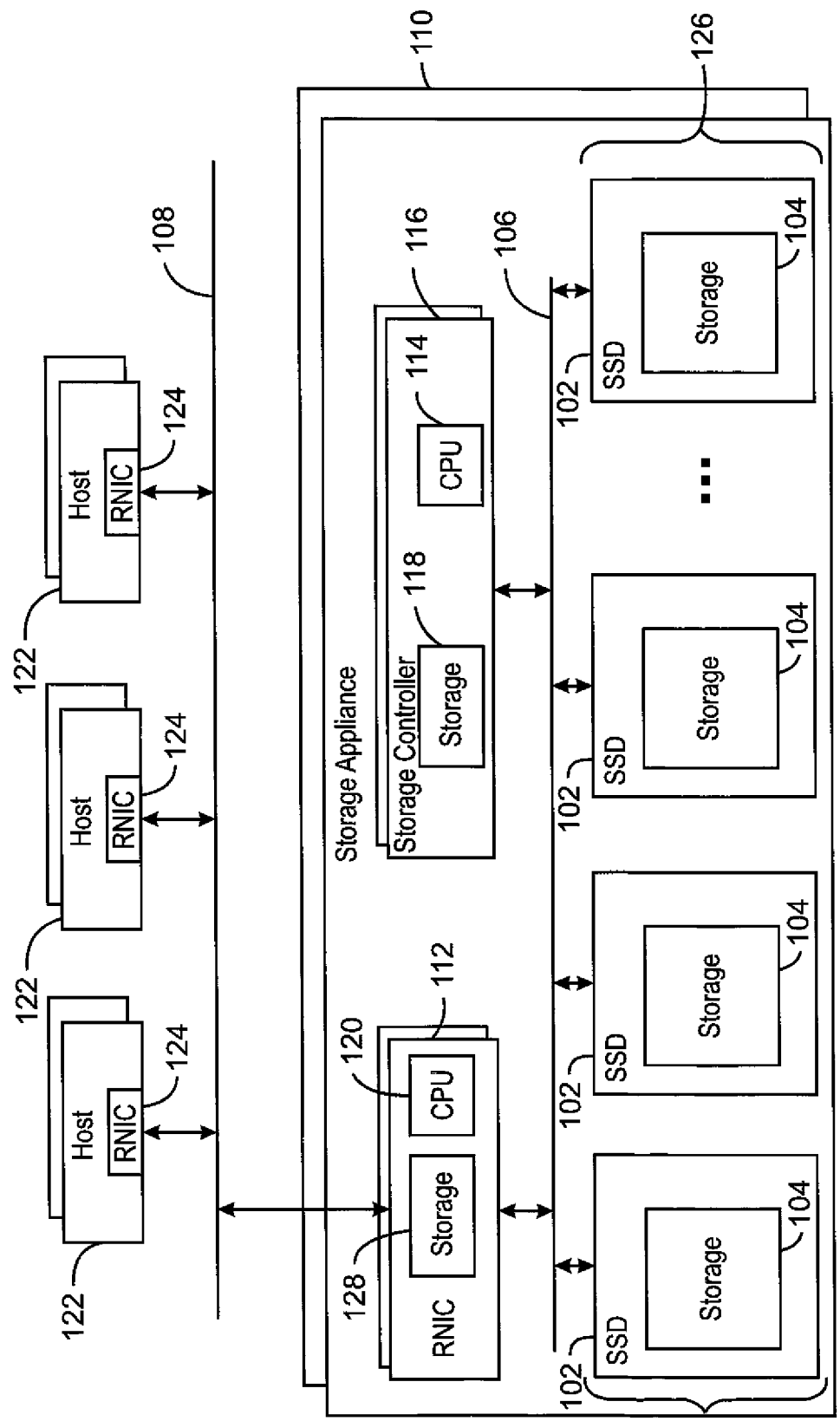
FIG. 1 is a block diagram of an example computing system using solid state drives.

FIG. 1 is a block diagram of an example computing system 100 using solid state drives 102. Solid state drives (SSDs) 102 have become more common for high performance computing applications. SSDs use non-volatile memory (NVM) as storage 104, such as flash, nonvolatile RAM (NVRAM), battery backed up dynamic RAM, and the like, to store data and to retain data in the absence of power. The storage 104 is used for data buffers, log files, caches, and other stores described herein, Thus, the data in these stores may be protected from power failures and other failures that may result in data loss.

As SSD technology has advanced, interface technologies used for hard drives, such as Serial AT Attachment (SATA), Serial Attached SCSI (SAS), and Fibre Channel, have become a limiting factor on SSD performance, such as data transfer rate, latency, and software overhead. Accordingly, new interface protocols have been developed using other interface technologies, such as PCIe and Ethernet. For example, the NVM express (NVMe) protocol has been promulgated for accessing SSDs 102 over a Peripheral Component Interconnect Express (PCIe) bus or network 106. Further, the NVM over fabrics (NVMf) protocol has been promulgated for propagating the NVMe protocol over Ethernet 108 using remote direct memory access (RDMA).

With the availability of high speed protocols for accessing SSDs 102 connected to a PCIe bus 106 or Ethernet 108, it becomes feasible to construct simple all flash storage appliances 110 using a remote direct memory access enabled network interface card (RNIC) 112 and a number of SSDs 102 interconnected via a PCIe bus 106. To date such subsystems have depended heavily on CPUs 114, for example, in storage controllers 116 or maintenance units, for command processing.

The storage controller 116 may be, for example, a blade server in a network environment, a personal computer, a workstation, and the like. The CPU 114 may include any processing resource, such as a single core processor, a dual-core processor, a multi-core processor, a number of processors, a computing cluster, a cloud sever, or the like. The CPU 114 may be coupled to the storage 118 by a bus where the bus may be a communication system that transfers data between various components of the storage controller 116. In examples, the bus may include a Peripheral Component Interconnect (PCI) bus, an Industry Standard Architecture (ISA) bus, a PCI Express (PCIe) bus, high performance links, such as the Intel® direct media interface (DMI) system, and the like.

The storage 118 may include random access memory (RAM); e.g.; static RAM (SRAM), dynamic RAM (DRAM); zero capacitor RAM, embedded DRAM (eDRAM), extended data out RAM (EDO RAM), double data rate RAM (DDR RAM), resistive RAM (RRAM), and parameter RAM (PRAM); read only memory (ROM), e.g., mask ROM, programmable ROM (PROM), erasable programmable ROM (EPROM), and electrically erasable programmable ROM (EEPROM); flash memory; or any other suitable memory systems. Further the storage 118 may include longer term storage, e.g.; non-volatile storage, such as a solid-state drive, a hard drive; a tape drive, an optical drive, a flash drive, an array of drives; or any combinations thereof. In some examples, the storage 118 may include non-volatile memory devices, such as non-volatile RAM (NVRAM); battery backed up DRAM, and the like.

In an example, the SSDs 102 may be on blades that are inserted into a rack along with the storage controller 116 to form the storage appliance 110. In another example, the storage appliance 110 may include SSD modules mounted on PCIe cards that are inserted into slots on a storage controller's 116 motherboard.

Improvements or optimizations have been proposed to allow data to flow directly from an RNIC 112 to a PCIe connected SSD 102 without accessing memory (storage) 118 controlled by a CPU 114. However, for all but the simplest storage appliances 110 this technique may create issues with virtualization functionality that requires software run on the CPU 114 to process the command.

Although the examples described herein are directed to solid state drives, it may be understood that other configurations may be used. For example, a group of hard drives or arrays communicating over a PCIe bus 106 may be used to form the storage appliance in place of the SSDs.

Overview

As discussed in detail in examples described here, RNICs 112 and SSDs 102 have added functionality to enable data, commands and responses to flow directly between the RNICs 112 and the SSDs 102 while software intensive virtualization functionality remains with the CPU 114; for example; in the storage controller 116. The CPU 114 remains in control of data layout, address translation, parity consistency and fault recovery. This helps enable a combination of accelerated normal processing with sophisticated virtualization that could not be accommodated by a CPU 120, such as an application specific integrated circuit (ASIC) resident on the RNIC 112.

Further, the direct data transfer between the SSDs 102 and the RNICs 112 may increase performance by avoiding memory hops for data flowing directly between an RNIC 124 in a host 122 and an array 126, for example, of just a bunch of disks (JBOD). The CPU 114 may remain in charge of all virtualization functions even though most normal operations complete before involving it.

To facilitate the direct communications, in an example, an RNIC 112 includes a set of layout templates and a layout selector in storage 128, as discussed further with respect to FIG. 4. The layout selector selects a layout template from a logical block address (LBA) provided in a transaction from a host 122. For example, the selector may calculate a field-wise hash of a host LBA to obtain a number corresponding to a layout template.

Each layout template lists a set of SSDs 102 and indicates which portion of the data for each portion of an LBA go to each of the SSDs 102 when that layout is selected. Each SSD may have a role as well, such as parity versus data (master versus slave as used herein). This may vary from layout template to layout template, with some SSDs functioning as parity, or master, disks for some LBAs, while functioning as data, or slave, disks for other LBAs.

As transactions (IOs), e.g., write transactions, arrive they are split or broken up according to the selected layout template and parts are sent directly to the SSDs. Each data portion is accompanied by an intent record with a unique identifier so that associated parts can be tracked by a central controller processor. The intent record includes the portion of the original host LBA that belongs to the data being written to or read from that SSD 102, but not a physical address on the SSD 102. Each SSD 102 places the part of the transaction it receives as well as the intent records, in the storage 104 within the SSD 102. The SSD 102 also caches the LBA portion so that read hits can be processed by the SSD 102, and conflicts can be flagged for resolution by the CPU 114.

When all parts of the transaction complete successfully the RNIC 112 responds to the host 122 indicating success. At that point, regardless of success or failure of the parts of the transaction sent to individual SSDs 102, the intent records are passed to the CPU 114, for example, in the storage controller 116, where a virtualization engine determines the physical addresses on each SSD 102 where the data should reside.

In order to manage the number of layout templates known to the layout template selector, the virtualization computation is constrained such that the same group of SSDs 102 is always chosen when the LBA driven computation yields a given numerical result. In other words, this means that sub-pools are pre-set by the parameters of the LBA calculation. These parameters may change as the system 100 grows, however that implies layout change and data reorganization. Lacking these constraints, layout template selection would require large volumes of metadata tantamount to that which is managed by the CPU 114 in the storage controller 116.

The storage controller 116 then contacts each of the SSDs 102 to assign physical addresses to the data the SSD 102 has recently received, and to handle errors or resolve write conflicts flagged by the SSDs 102, Redundancy, e.g., parity, may be calculated within the controller processor or the SSDs 102, for example, in a master SSD 102 that stores the parity stripe. The SSDs 102 are allowed to flush data and stop tracking new data as soon as they are told the correct physical address by the storage controller 116.

In some examples, as discussed further with respect to FIG. 5, additional redundancy considerations in the form of parity consistency may be added to the example described above by adding additional states to the intent records in the master and slave SSDs 102 designated by each layout template. With the additional redundancy, the communication from the CPU 114 that assigns physical addresses places slave SSDs 102 in a multi-version state that indicates that old and new versions of recently written data are to be maintained until consistent parity can be committed. Thus, the parity may be calculated if power fails during the process.

Master SSDs 102 arbitrated by the layout template may also have additional states such that a single state transition on a master represents the commit point of the new parity. Messages from the CPU 114 to the master and slave SSDs 102 sequence their states in such a way that old versions of data are not destroyed until consistent parity is committed. Recovery from failure may be modeled after a redundant cache in front of a redundant disk group. The cache is analogous to the initial mirrored copies of data across the SSDs 102 while the disk set is analogous to the RAID data across the same SSDs 102.

In some examples, the complexity of managing the layout templates may be mitigated by adding the ability to modify layouts in real time to the examples described above. This may be performed without forcing excessive CPU 114 intervention prior to the completion of each transaction. For example, a transaction is assigned a layout by the RNIC 112, but when the CPU 114 post-processes the transaction it may discover that there is a new or preferred layout for that LBA that was not the one chosen by the RNIC 112. In this case the CPU 114 treats the SSDs 102 in the layout provided by the RNIC 112 as a cache and copies the data to the new layout prior to or during the computation of parity.

Given this approach to managing new layouts, the layout template selector can be atomically updated at any point as long as a given transaction is subject only to one selector or the other, e.g., as determined by the time the transaction is received. Template changes in the RNIC 102 do not need to wait for transactions in flight to finish as they will be corrected by the CPU 114. This may improve the performance of data flows as data does not need to be retained in the storage 118 of a storage controller 116 or involve the CPU 114 before completion.

Figure 2:
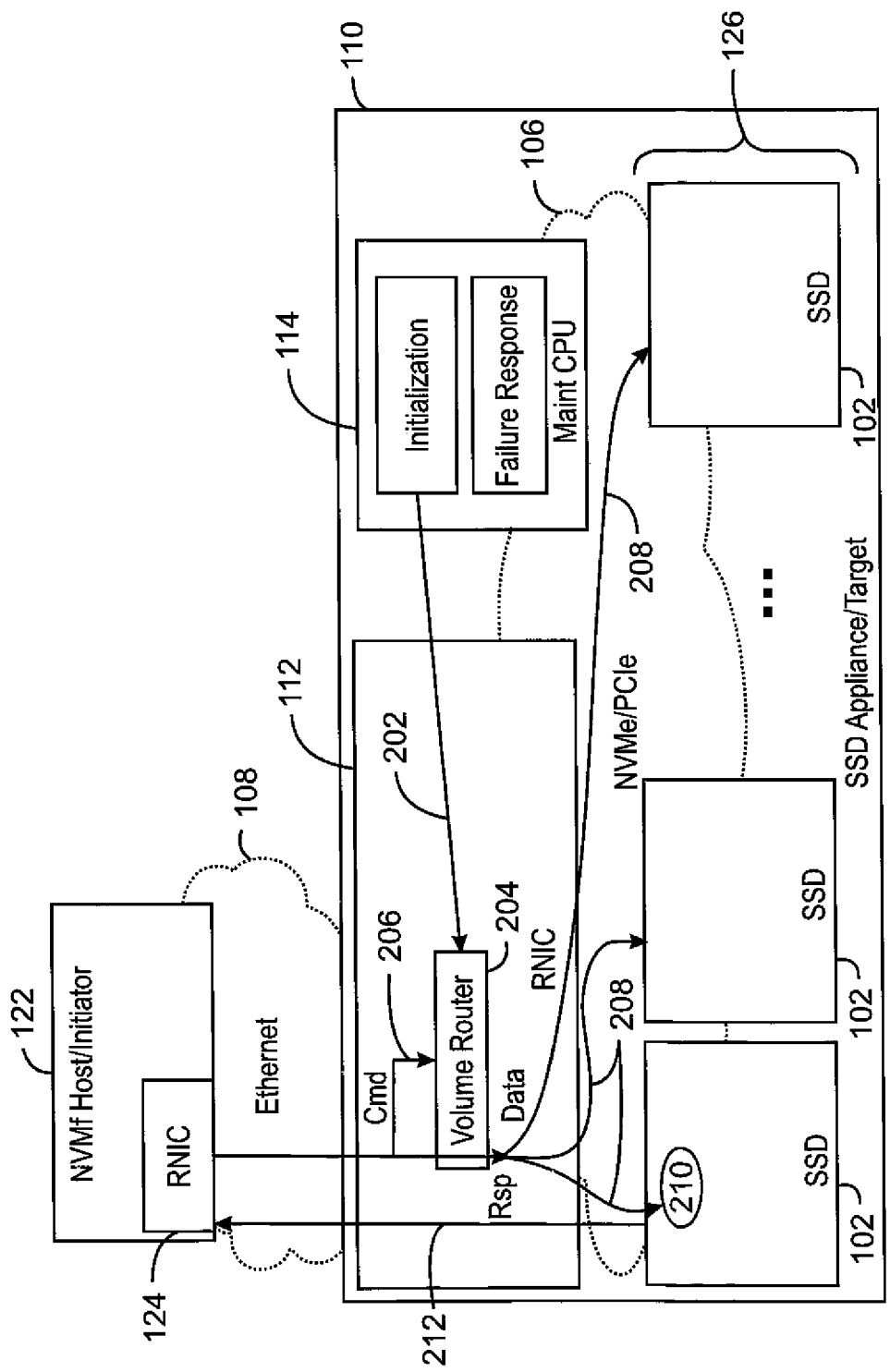
FIG. 2 is a schematic example of an remote direct memory access enabled network interface card (RNIC) directly storing data from an server to an array of solid state drives.

FIG. 2 is a schematic example 200 of an RNIC 112 directly storing data from a host 122 to an array 126 of solid state drives 102, Like numbered items are as described with respect to FIG. 1. A host (initiator) 122 uses an RNIC 124 to connect to an Ethernet network 108. Likewise, a solid state disk (SSD) appliance 110 (target) contains an RNIC 112 which may have direct access capabilities to reach the SSDs 102, for example, over a PCIe bus 106. Within the SSD appliance 110, the RNIC 112, SSDs 102 and a CPU 114, e.g., in a storage controller or local maintenance system, are all connected to the PCIe bus 106 (shown as a cloud to simplify the drawing), The additional capabilities may allow the RNIC 112 to determine, by analyzing a read or write command from a host 122, which SSDs 102 hold the data being manipulated by the command. The RNIC 112 can then use PCIe bus 106 to send or receive the associated data to or from the SSD 102 directly using the PCIe bus 106 without interrupting the CPU 114. This may be performed by using a volume router that associates particular volumes of data with particular SSDs 102, Generally, commands from a host 122 include a volume number that may be located and interpreted. It is especially convenient when the NVM Express (NVMe) protocol is used over both the RNIC 112 and PCIe bus 106 as little if any translation is required.

Referencing the numbered lines in the figure, an RNIC 112 may perform the direct access as follows. As indicated by line 202, the CPU 114 local to the SSD appliance 110 initializes the volume router 204 to represent a mapping of volumes to SSDs 102. A given volume may span multiple SSDs 102 using techniques such as concatenation or striping. As indicated by line 206, a command from the host 122 is inspected by the RNIC 112 to locate the volume, which is indexed through the volume router to find the SSDs 102 and calculate physical SSD addresses.

As indicated by lines 208, data is exchanged with specific SSDs 102 based on information in the volume router. For write transactions, the data is split across SSDs 102 as needed. For read transactions, the data is merged by the RNIC 112 so as to identify each byte correctly to the host 122. The data 210 may then be read or written normally. As indicated by line 212, when all SSDs 102 have completed their parts of the transaction the RNIC 112 generates a response to the host 122 that represents success or failure of the entire operation.

While this type of direct access may enable distribution of data across SSDs 102, it does not accommodate more complex virtualization functions and services that require a CPU 114 in the target to intervene. Such intervention may be employed for on line configuration changes, coordination of multiple RNICs 112 or compute intensive data management automation. Furthermore many virtual arrays provide fine grained mapping and movement of data. This requires large volumes of metadata that may not align with the hardware resources (memory or processing) of an RNIC 112.

Optimistic SSD Storage Appliance

Figure 3:
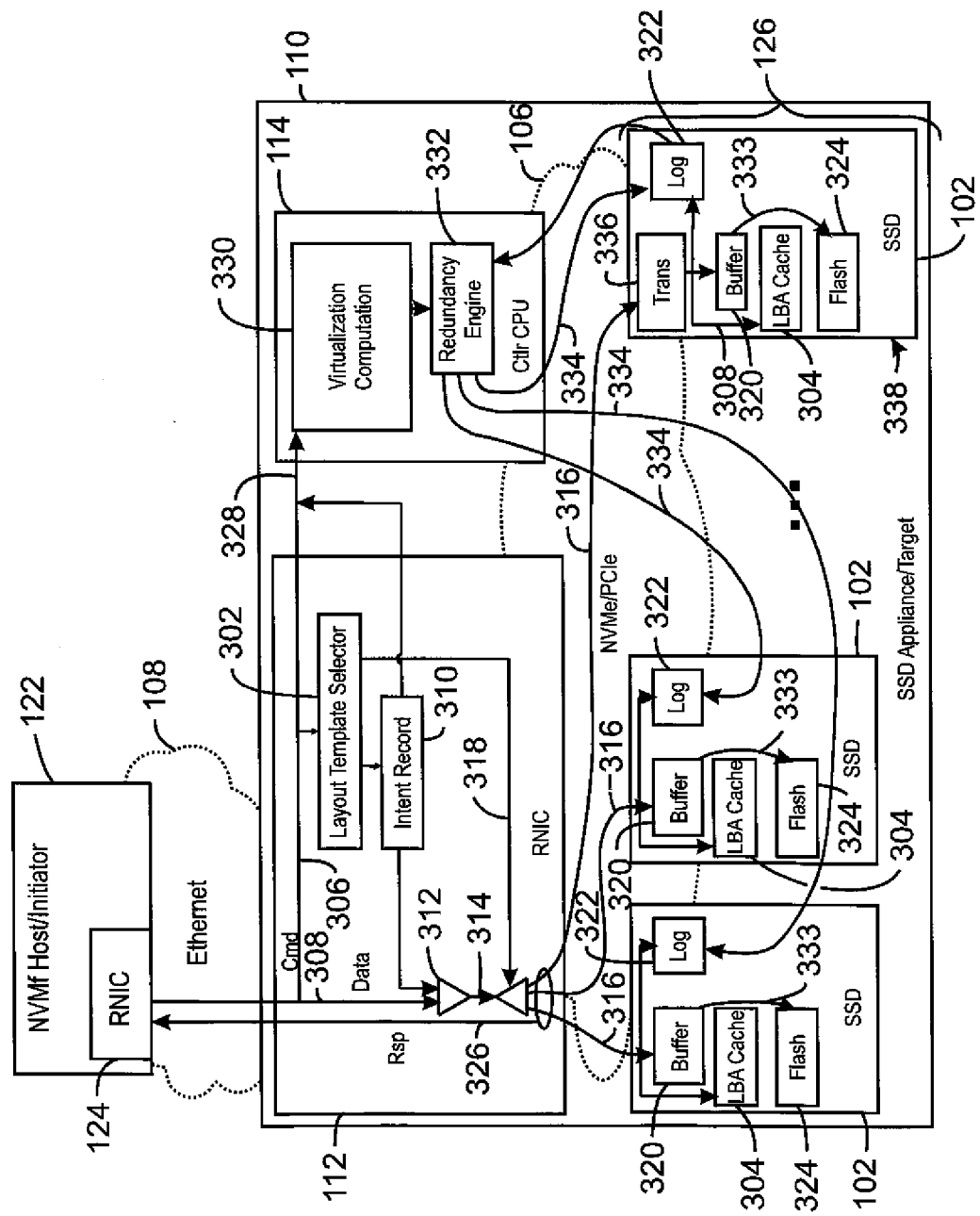
FIG. 3 is a schematic example of an RNIC directly storing data from an server to an array of solid state drives using an optimistic storage allocation.

FIG. 3 is a schematic example of an RNIC 112 directly storing data from a host 122 to an array 126 of solid state drives 102 using an optimistic storage allocation. As used herein, an optimistic allocation indicates that a storage decision is made and the transaction is acknowledged as complete to the host 122 prior to the final commitment of the data to a storage location in the array 126. The physical addresses for the storage of the data in the array 126 are determined by a CPU 114. Like numbered items are as described with respect to FIG. 1.

FIG. 3 shows the same overall hardware architecture as FIG. 2, with a number of enhancements to provide direct communications. The volume router is replaced with a more sophisticated layout template selector 302 that can be aligned with physical layout policies from virtualization determined by the CPU 114. A selected layout template determines the routing of data to the correct SSDs 102, but it does not determine the physical address of data placement on any SSD 102. The physical address is determined later as a result of intervention by the CPU 114. The SSDs 102 have added functionality to cache logical block addresses (LBA's) as they appear in the host's 122 address space. This is one of the purposes of the LBA caches 304 shown in the SSDs 102. Although it is shown separately here, the CPU 114 may be included in the RNIC 112 in some examples. In other examples, multiple CPUs 114 may share the work within an SSD appliance 110.

The data flow is described with respect to the labeled lines. As indicated by line 306, a read or write command received from a host 122 is routed to the layout template selector 302 and staged for transmission to the CPU 114. The layout template selector 302 performs a function on the volume and LBA in the command. The function may be a hash function or a masking and shifting function to convert the volume and address into a layout number. The result of function provides a layout number that may be used to choose a layout template for the data 308 in the command. The layout template associated with the layout number indicates which SSDs 102 should be involved in each part of the data transfer.

For each part of the data transfer, an intent record 310 with a unique identifier is created describing that part. The intent record 310 includes the original host address, length of that part of the data, and the role the SSD 102 is to play in the data transfer as specified by the layout, e.g., master or slave. The intent record 310 is also staged for transmission to the CPU 114.

For a write transaction, the intent record 310 and the data 308 are merged 312 to form a data stream 314. The data stream 314 is then sent to the respective SSDs 102, as indicated by line 316, based on the layout template provided by the layout template selector 302, as indicated by line 318. Thus, for a write transaction, each part of the data transfer for each SSD 102 includes both the data 308 and the intent record 310. For a read transaction, only the intent record 310 for each part is sent to the respective SSD 302.

An SSD 102 receives the intent record 310 and, for write transactions, the data 308. For write transactions, the SSD 102 adds the host address of the data to its LBA cache 304 and stores the data in a non-volatile data buffer 320. It then places the intent record 310 in an intent log 322 to indicate which data 316 is in flight and links it to the data 316. If there is already an intent record 310 in the intent log 322 for an overlapping host address then the new record is linked to the prior record and the write transaction is tagged as incomplete.

For read transactions, each SSD 102 checks its LBA cache 304 for a record of the host LBA. If it is found, it may refer to a region of either the data buffer 320 or the flash 324, If the address is found then the data is returned in response to satisfy the read request and transmitted by the RNIC 112 to the host 122, as part of the response 326. Otherwise the SSD 102 will need to wait for intervention by the CPU 114 before the read can be completed. In this later case, or in the case of an incomplete write transaction, the SSD 102 responds to the RNIC 112 indicating that the transaction could not yet be fulfilled.

The responses 326 of all SSDs 102 are collected by the RNIC 112. At this point the command 306, the combined intent record 310 from all of the SSDs 102, and state information indicating the result are transmitted to the CPU 114, as indicated by line 328. In addition, if all parts were successful, e.g., no errors or unfulfilled transactions occurred, then the RNIC 112 generates a positive response to the host 122 indicating completion of the transaction. In the event of an error or unfulfilled transaction the RNIC 112 waits for the CPU 114 to intervene before responding to the host 122.

The virtualization computation module 330, functionally performed by the CPU 114, receives the command 306, intent record 310, and state information and determines the correct physical addresses for all the parts of the data on all of the SSDs 102. This may involve the designation of previously unallocated space on SSDs 102 to be used for data 308 in a write transaction. Having assigned physical addresses the virtualization computation module 330 passes control to the redundancy engine 332.

The redundancy engine 332 acknowledges transactions to the SSDs 102 by transmitting an indication of the physical address for each part of a transaction to the SSD 102 responsible for that part, as indicated by line 334. If a write transaction was unfulfilled due to a collision in an intent record stored in an intent log 322 for an SSD 102 and the corresponding data was delivered to more than one SSD 102, the redundancy engine 332 may reverse the order of write transactions in the intent logs 322 in some SSDs 102 during the acknowledgement process so that all reflect the same end result.

If a RAID computation in the parity SSD 102 requires old data from a data SSD 102 in order to complete the parity computation then prior to acknowledging a transaction the redundancy engine 332 may use a special read through command to copy that data from the data SSD 102 to the parity SSD 102. The read through command ignores the data associated with write transactions to the SSD 102 that have not yet been acknowledged by the redundancy engine 332. The redundancy engine 332 may acknowledge multiple transactions in a single communication to an SSD 102.

For a write transaction, the acknowledgement permits the SSD 102 to pass the correct data, e.g., arbitrated as most recent, out of its data buffer 320 to the physical location corresponding to the physical address in the flash 324, as indicated by line 333. The SSD 102 is then allowed to remove the intent record from the intent log 322. On a read, the physical address allows any SSDs 102 that were unable to complete the read to locate their data. At this point the SSD 102 may remove the host LBA from the LBA cache 304. The cached LBA may be retained in the LBA cache 304, for example, as long as there is storage space, as subsequent read transactions can complete more quickly if it is retained. All read transactions are checked against the intent records in the intent log 322 and are held until the dependent write transactions are acknowledged by the redundancy engine 332 before they can be completed.

One of the SSDs 102 is shown with a transformation module 336 in the data path, identifying it as a master or parity SSD 338. The transformation module 336 may be included to perform additional data manipulation such as a RAID parity calculation. Any or all SSDs 102 in the SSD storage appliance 110 may include the transformation module 336, as different SSDs 102 may function as data or parity stores in different layout templates. Multiple parts of a data transfer may be sent to the parity SSD 338, in addition to other SSDs 102, to enable the complete transformation. The redundancy engine 332 may choose an order in which to acknowledge transactions by sending the physical address to the various SSDs 102 so as to ensure correct tracking of data in flight. For example, the redundancy engine 332 may choose to acknowledge the transaction on a parity SSD 338 after all of the other SSDs 102 have been allowed to flush data from the data buffer 320 to the flash 324. This helps ensure that at least one SSD 102 will have a record of the data in flight until parity is consistent across all SSDs 102 involved in a transaction.

In some examples, one or more SSDs 102 may be unable to respond to a request due to a failure. In this case, the redundancy engine 332 examines the state of each SSD 102 and the contents of its intent log 322. If data is missing, data may be recovered using RAID techniques. If the failure is a power loss, parity for data in flight as indicated by the intent logs 322 in all of the SSDs 102 may need to be recomputed.

In the event of failure or configuration change, incomplete commands being tracked by the RNIC 112 may be partially or completely retried by the RNIC 112 or the host 122. The redundancy engine 332 sequences recovery operations in the SSDs 102, RNICs 112, and hosts 122 (via responses 326), to achieve as complete a recovery as possible based on the nature of the failure.

Robust Redundancy

This section describes an example that enables enterprise class high availability when using an RNIC 112 with a layout template selector 112 and work in progress caching in the data buffer 320 of the SSDs 102. This may provide the ability to tolerate a hardware failure concurrently with a power loss. The prior example may not do this as the work in progress during a power loss may leave parity inconsistent, meaning that the system is in a state that would not enable full recovery from another failure. In the prior example, the state may continue until parity affected by write transactions in progress during the power loss is restored from the contents of the data.

The redundancy may be enhanced by the addition of an intent log entry state in the intent log 322. The intent log entry state indicates that old and new versions of data are to be maintained until a signal is received from the redundancy engine 332 indicating that the data may be flushed from the data buffer 320 to the flash 324, overwriting the old data.

Various state indications are used, depending on whether the SSD 102 is a master or slave, e.g., a drive storing a parity stripe versus a drive storing a data stripe. For a drive functioning as a slave, an "in-flight" status indicates data that is in the process of being written, but may not be consistent across all SSDs 102. Data read commands from a host 122 do not return data that is in the in-flight mode. The second state for slave drives may be termed "multi-version" and indicates that both the old version of the data in flash 324 and the new version in the data buffer 320 should be retained. The older version is accessed with the read through command, and the new version may be accessed with a normal read command. Read commands from the host 122 will be fulfilled from the new version of the data in the data buffer 320.

The new states for a master SSD 102 include the in-flight status also used for the slave SSDs 102. The master SSD 102 has an additional state termed "mirrored". In the mirrored state, the data across all of the SSDs 102 is consistent and redundant, but the redundancy (parity) calculations are still in progress. Once the redundancy calculations are completed, the intent state for the master SSD 102, e.g., the parity SSD 338, can be changed to "committed". The committed state represents the commit form of the redundancy, and is the point at which all other SSDs 102 may be released to flush the new data from the data buffer 320 to the flash 324, replacing the old data in the flash 324, as indicated by line 333. All states may then be changed to be "untracked", as no data is in flight and parity calculations are complete.

In this example, as described for the previous example, the layout template selected by the layout template selector 302 may be used to create an intent record with a unique identifier for each part of a write command from a host 122. The intent record includes an indication of which SSDs 102 are master SSDs 102. Data parts and intent records are transmitted to the SSDs 102 indicated in the layout template. The data is stored by the SSD 102 in its data buffer 320. Further, in this example, the host LBA is cached and associated with the intent record which is placed in the intent log 322 of the SSDs 102, along with the intent log entry state which is recorded in the "In Flight" state. Collisions in the intent log 322 cause a response to the smart RNIC 112 indicating an unfulfilled request. The transition to "in flight" occurs on both master and slave SSDs 102.

For any part of the transaction where responses from SSDs 102 indicate success, the RNIC 112 informs all master SSDs 102, as defined in the layout template, that the part was successful. This may cause the intent record state in the master SSD 102 to transition to "mirrored", pending success of the same part on two or more SSDs 102. If all parts of the transaction on all SSDs 102 were successful, the RNIC 112 responds to the host 122 indicating success of the transaction. Regardless of success, when all SSDs 102 have responded, the RNIC 112 sends the intent records and SSD responses to the virtualization computation module 330.

As described above, the virtualization computation module 330 assigns physical addresses then forwards control of the transaction to the redundancy engine 332. The redundancy engine 332 resolves write order conflicts and then delivers physical addresses to all of the SSDs 102. At the same time the intent logs in the intent log 322 of the slave SSDs 102 are transitioned to the multi-version state and the master SSDs 102 are transitioned to the mirrored state, if not before. Thus, data associated with intent log entries in the multi-version state will not over-write untracked data versions.

If no unresolved errors have been detected and the host 122 has not been notified of successful completion of the transaction, then the redundancy engine 332 provides such notification via the RNIC 112 at this point. If errors remain then the failure recovery algorithms in the redundancy engine 332 may use techniques that are used for RAID or erasure coded media that is fronted by a mirrored write back cache, to regenerate the lost data.

The redundancy engine 332 may calculate RAID or erasure code parity blocks using old and new versions of the data retained in the SSDs 102. These may be obtained using the read though commands to obtain the old data, and the read command to obtain the new data. Old parity blocks are not overwritten at this point. Instead new parity blocks are retained in data buffers 308, for example, in the master or parity SSD 338. Once all parity modifications are complete and placed in data buffers 308, the redundancy engine 332 transitions all intent log entry states in the master SSDs 102 to the committed state for the transaction, After all master SSDs 102 have transitioned, the redundancy engine 332 transitions the state of all intent log entry states for the slave SSDs 102 to the untracked state. After the slave SSD records are untracked the redundancy engine 332 transitions the master records to untracked as well. Since all of the data involved in the transaction is now untracked, corresponding data in the data buffers 320 now replaces the old version of the data in the SSD and can be flushed to flash, as indicated by line 333.

Dynamic Layout Changes

In the examples described above, a layout change may cause a potentially extended period of intervention by the CPU 114 before transactions can complete. In this example, a dynamic data placement may be used to resolve that problem, using methods in the virtualization computation module 330 to correct data placement after the transaction has completed from the perspective of the host 122. This allows an optimistically allocated transaction completion to proceed normally in spite of any layout change as long as the layout template initially used for the transaction does not encounter hardware errors.

This may provide improvements when layout exceptions occur. Layout exceptions may be caused by hardware failures, optimization of data locality, minimization of data movement, temporary participation of data in an active value added service such as a snapshot, or long term relocation of data, among others. The dynamic data placement may use multiple layouts for the same data, one of which is used in real time by the RNIC 112 for a given transaction. The initial layout may be temporarily maintained as a cache for data that being moved to a different layout.

According to this example the initial progress of a transaction proceeds normally using the template that was selected by the RNIC 112 when the transaction arrived, as described for the optimistic SSD appliance. The transaction proceeds up to the point where the virtualization computation module 330 is given control. At that point the CPU 114 may continue to allocate the data up to the point where the transaction completes from the point of view of the host 122. At that point the virtualization computation module 330 determines whether the layout template used for the transaction matches the desired layout for the data. If it matches, the work flow proceeds in the same manner it would have without dynamic data placement.

Otherwise, for write transactions, the transaction data in the SSDs 102 is treated as if it were stored in a non-volatile mirrored cache. For a write transaction, when the virtualization computation module 330 has created an alternate layout template in the RNIC 112, it proceeds to copy the mirrored data to mirrored locations in the new layout. It then completes the original allocation according to the new layout. For some period of time the data may be in data buffers 320 in SSDs 102 indicated by both layout templates.

For read transactions the CPU 114 executes the transaction entirely as if it had occurred using the new layout template, since the SSDs 102 in the old layout are managed in such a way that they are unable to resolve the physical addresses for data that has been relocated to the new layout. Read transactions during layout changes are managed by forcibly invalidating the LBAs in the LBA caches 304 that are not involved in the new layout for that data, Invalidation occurs after each redirected transaction completes, but before it is copied to SSDs 102 in the new layout. Even though LBAs for those data are not in an LBA cache 304 for an SSD 102, the data may remain in the intent log 322 and the data buffer 320 of the SSD 102 until they are successfully mirrored into the new layout. Collisions between reads and recent writes may require writes that used the old layout to be transitioned to the new layout by the CPU 114, before colliding reads can be completed.

This allows layout information to be added to or modified in the layout templates used by the layout template selector 302 of the RNIC 112 at any time, as long as any transaction chooses layout templates from a consistent version of the layout templates stored in selector tables. This may be accomplished by making updates to the layout templates atomic, for example, using swing buffers and the like.

Various changes may be implemented for all of the examples discussed herein, depending on the implementation. For example, multiple RNICs 112 can access the same SSDs 102, provided that they all send their notifications to the same CPU 114 or into a cluster of CPUs that logically behave like a single CPU. In large systems it may be desirable to have multiple layout template selectors 302 in each RNIC 112 whose notifications can be processed independently by CPUs 114. In this case the volume number might be used to choose a layout template selector 302 and a CPU 114.

If multiple RNICs 112 can access the same SSDs 102, layout changes need to be coordinated across them. This can be accomplished by pausing the flow of new transactions into all RNICS 112 and changing the layout template selector 302 after all are paused. In one example, the RNICs 102 may not need to wait for transactions in progress to complete during a coordinated layout change.

Figure 4A:
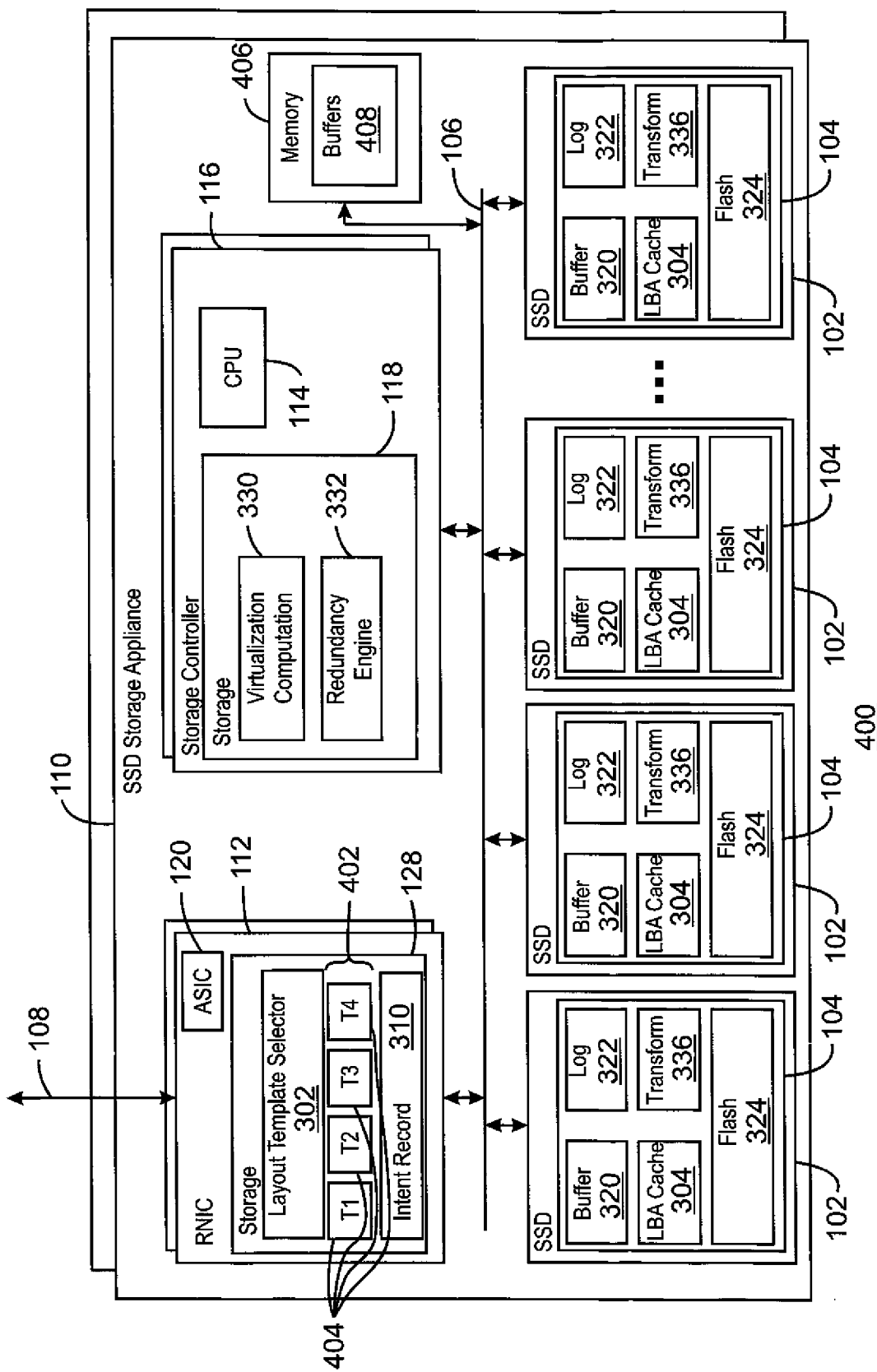
FIG. 4A is a block diagram of an example optimistic storage appliance using SSDs.

FIG. 4A is block diagram of an example optimistic storage appliance 400 using SSDs 102. Like numbered items are as described with respect to FIGS. 1 and 3. In this example, the CPU 120 for the RNIC 112 is shown as an application specific integrated circuit (ASIC). In this example, each of the SSDs 102 may function as either a master or a slave, e.g., as a data store or a parity store for a particular layout template 404. Thus, each of the SSDs 102 includes a transformation module 336 to perform a parity calculation for stored data.

The RNIC CPU (ASIC) 120 operates the layout template selector 302 which maintains a layout template table 402 including the layout templates 404. One example of an approach that may be used by the layout template selector 302 includes a selector table that includes an LBA Mask, which is a bitwise mask indicating the subset of the LBA that is used in a layout number calculation. This, along with the LBA shift, account for striping or concatenation parameters of the layout. The table includes the LBA Shift, which is a number of bits to right shift the masked LBA. Further, the selector table includes a masked LBA modulus, which is a modulus that is applied to the masked, shifted LBA concatenated with the volume number to account for parity rotation.

The LBA from the transaction is masked, shifted, and concatenated to the volume number. The modulus is applied to the result to yield a layout template number. Although this example is simplified, more complex calculations may be used, for example, involving multiple masks or more complex hashing functions, among others. These may be combined in ways that are encoded in logic associated with the layout template table 402.

The layout number is used to select a layout template 404, for example, T1-T4, from the layout template table 402. The layout template table 402 includes a number of parameters that can determine which of the SSDs 102 to save portions of the data and parity. The parameters may include a list of addresses for the SSDs 102 on the PCIe bus 106, in this example. The parameters may also include a role for each SSD 102 such as data (slave) or parity (master).

A second LBA mask, shift, and modulus may be applied in a manner similar to the derivation of the layout number to select an individual SSDs 102 based on specifics of the layout. The two mask, shift, and modulus sets may be different. The role of the SSDs 102 indicated in the second layout template 404 selected may trigger data transmission to additional SSDs for redundancy purposes.

In some examples, a layout number may not refer to any SSD addresses. This is an indication that the layout with that number must be handled by the CPU 114. Such commands are processed using conventional methods such as buffering data through memory 406 accessible to the PCIe bus 106.

In still other examples, an SSD address in the layout template 404 may have a special value that refers to memory 406 accessible to the PCIe bus 106. Write commands that encounter such addresses may place data in buffers 408 drawn from a pool of free memory regions in the memory 406 before notifying the CPU 114 that the command has been received. In such cases the addresses of the data buffers 408 are delivered to the CPU 114 with the command. The pool of free memory regions may be restored by either the CPU 114 or the RNIC 112 when the memory regions become free upon completion of read transactions from the host, write transactions to SSDs 102, or other operations that consume memory. Transactions that encounter an SSD address that refers to memory may not be fully completed by the RNIC 112 in this example.

In other examples, the SSDs 102 may be accessible over another network, possibly the same one where the transaction arrived, e.g., the Ethernet network 108. In these cases a CPU 114 may be managing SSDs 102 attached to another controller physically separate from the first. This configuration may be used to increase fault tolerance.

Figure 4B:
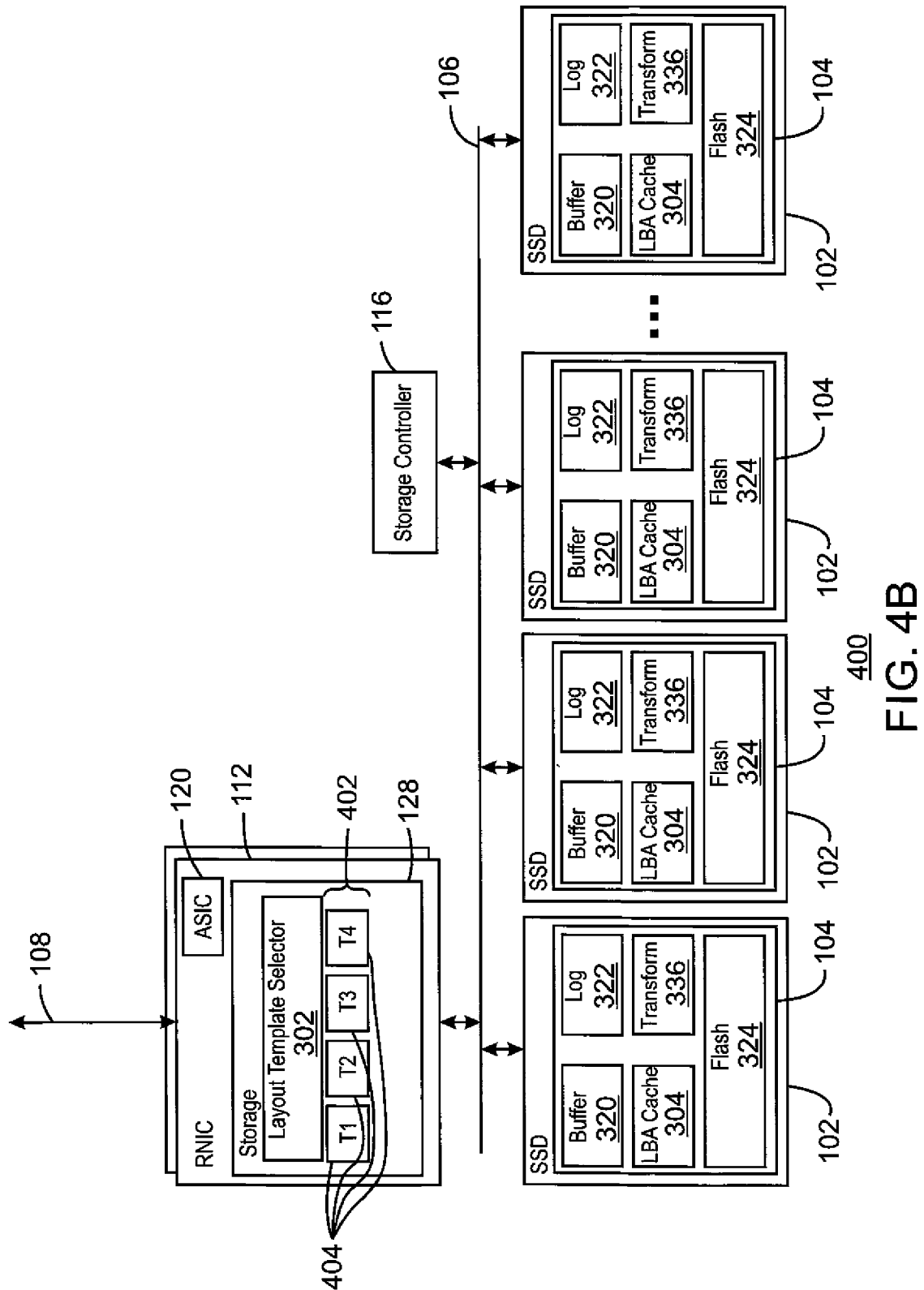
FIG. 4B is a block diagram of an example optimistic storage appliance using SSDs.

FIG. 4B is block diagram of an example optimistic storage appliance 400 using SSDs 102. Like numbered items are as described with respect to FIGS. 1 and 3. The system is not limited to having all of the blocks shown in FIG. 4A, but may have fewer blocks, as shown with respect to FIG. 4B.

Figure 5A:
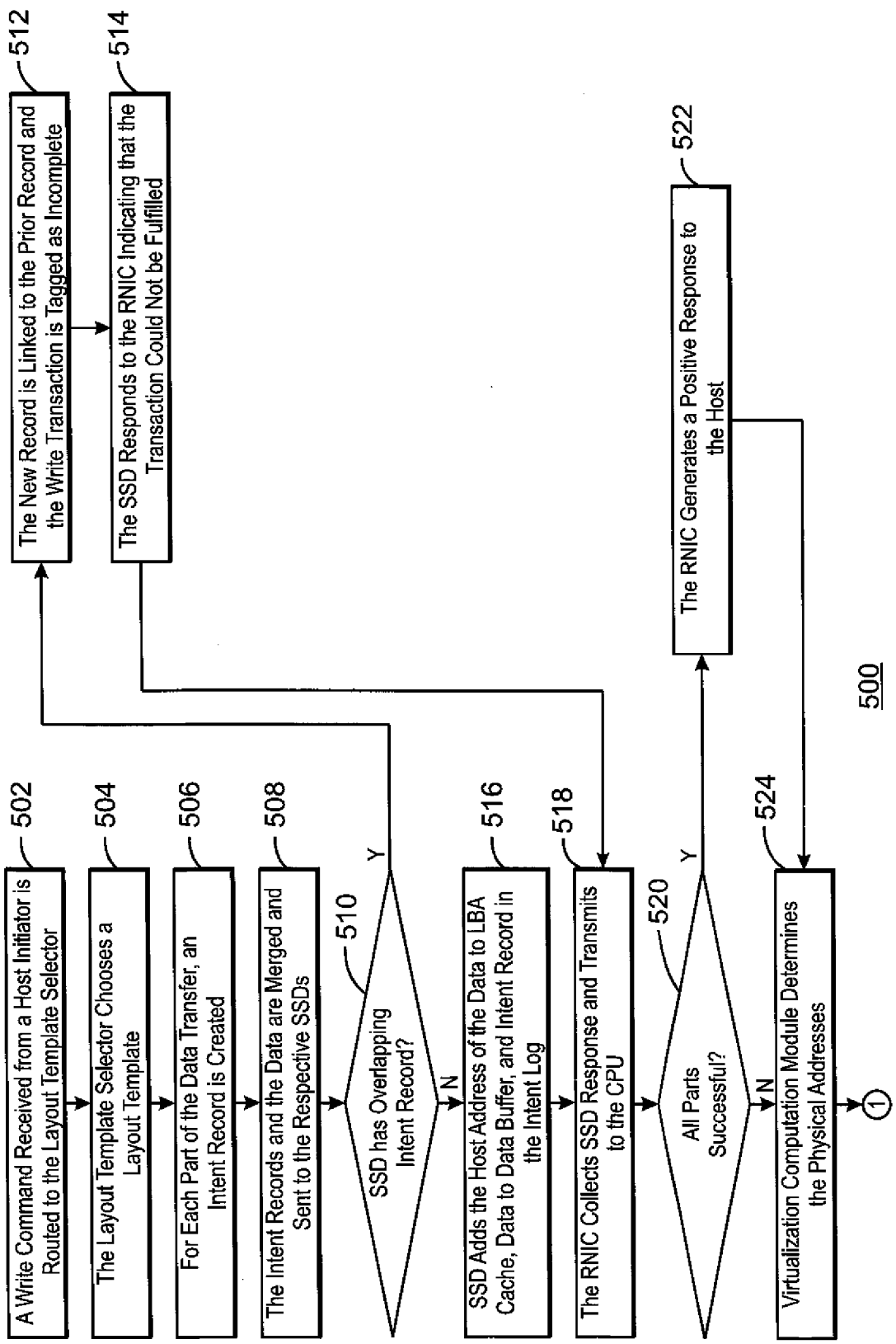
FIGS. 5A and 5B are a process flow diagram of an example method for the optimistic storage of data.
Figure 5B:
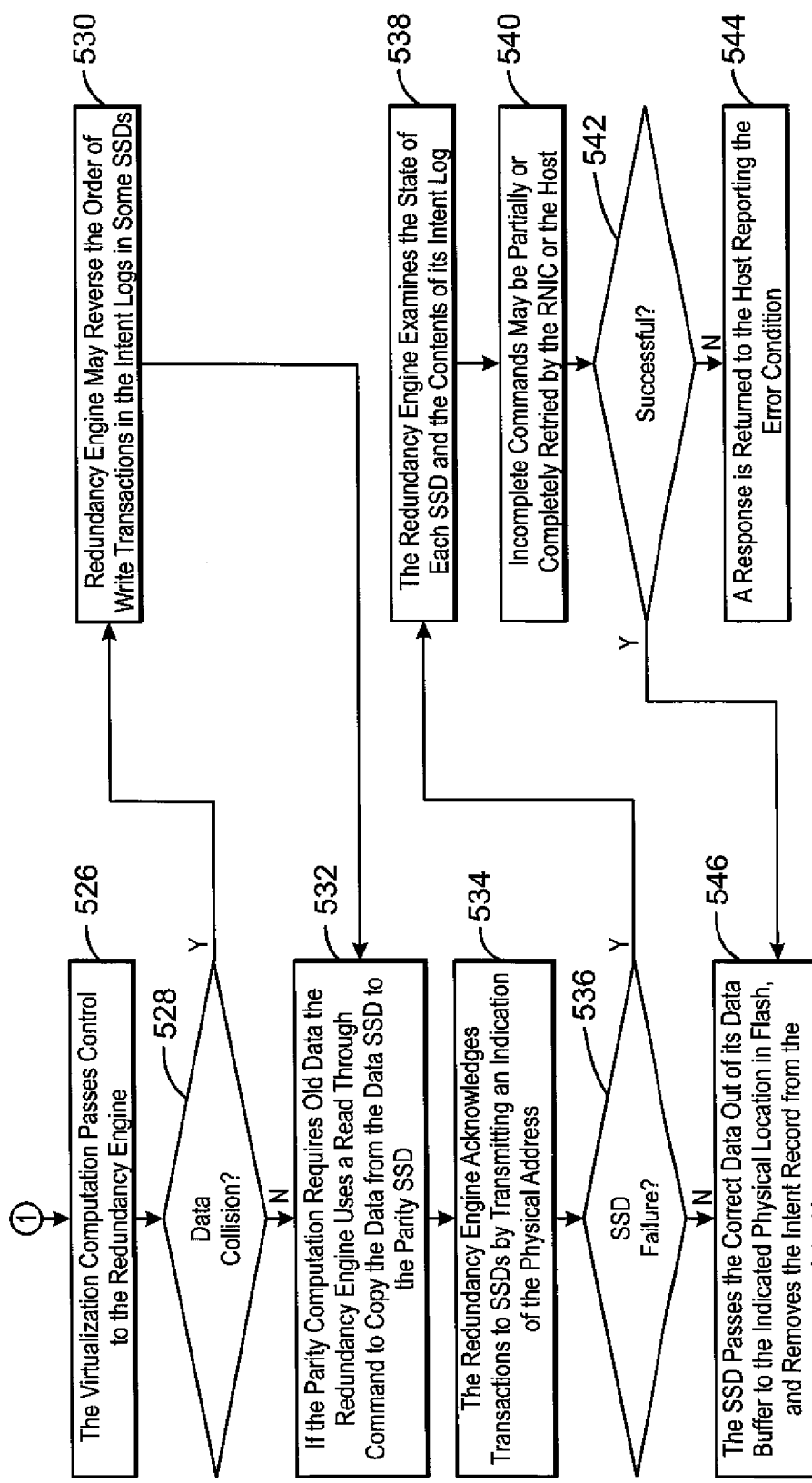

FIGS. 5A and 5B is a process flow diagram of an example method 500 for the optimistic storage of data. The method 500 may be performed by the system of FIG. 4. The method 500 begins at block 502, when a write command received from a host initiator is routed to the layout template selector and staged for transmission to the controller CPU.

At block 504, the layout template selector performs a function on the volume and LBA in the command in order to choose a layout template for the data in the command. The function may be a hash function or a masking and shifting function to convert the volume and address into a layout number. The layout template associated with the layout number indicates which SSDs should be involved in each part of the data transfer. The data is divided into a number of parts based on the layout template for transfer to the SSDs.

At block 506, for each part of the data transfer, an intent record with a unique identifier is created describing that part. The intent record includes the original host address and length of that part and the role the SSD is to play in the data transfer as specified by the layout template. The intent record is also staged for transmission to the controller CPU.

At block 508, the intent records and the data are merged and sent to the respective SSDs so that each part of the data transfer for each SSD includes both the data and the intent record. In some examples, the intent log may be transmitted as part of a command to the SSD, preceding transmission of the data.

At block 510, an SSD receives the intent record and the data, and checks to see if there is already an intent record in the intent log for an overlapping host address. If so, at block 512, the new record is linked to the prior record and the write transaction is tagged as incomplete. Further, at block 514, or in the case of an incomplete write transaction, the SSD responds to the RNIC indicating that the transaction could not yet be fulfilled.

If no overlap exists, at block 516, the SSD adds the host address of the data to its LBA cache and the data to its data buffer. It also places the intent record in the intent log to indicate which data is in flight and links it to the data.

At block 518, the responses of all SSDs are gathered by the RNIC. At this point the command, intent record and state information indicating the result are transmitted to the controller CPU. At block 520, if all parts were successful, e.g., no errors or unfulfilled transactions occurred, then at block 522, the RNIC generates a positive response to the host indicating completion of the transaction. In the event of an error or unfulfilled transaction the RNIC waits for the controller CPU to intervene before responding to the host.

At block 524, the virtualization computation module in the controller receives the command, intent record and state information and determines the correct physical addresses for all the parts of the data on all of the SSDs. This may involve the designation of previously unallocated space on SSDs to be used for the data.

At block 526, having assigned physical addresses the virtualization computation passes control to the redundancy engine. If at block 528, the redundancy engine determines that a write transaction was unfulfilled due to a collision in an SSD's intent log and the corresponding data was delivered to more than one SSD, at block 530, the redundancy engine may reverse the order of write transactions in the intent logs in some SSDs during the acknowledgement process so that all reflect the same end result.

If, at block 532, the RAID computation in the parity SSD requires old data from a data SSD in order to complete the parity computation then the redundancy engine uses a special read through command to copy that data from the data SSD to the parity drive. The read through command ignores the data associated with write transactions to the SSD that have not yet been acknowledged by the redundancy engine. The transformation module in the SSD may then perform the additional data manipulation. As described herein, any or all SSDs may contain such a module. Multiple parts of a data transfer may be sent to the parity SSD in addition to other SSD's to enable the complete transformation.

At block 534, the redundancy engine acknowledges transactions to SSDs by transmitting an indication of the physical address for each part of a transaction to the SSD responsible for that part. The redundancy engine may acknowledge multiple transactions in a single communication to an SSD.

The redundancy engine may choose an order in which to execute blocks 532 and 534 for various SSDs so as to ensure correct tracking of data in flight. For example, the redundancy engine may choose to execute block 532 on a parity SSD after blocks 532 and 534 are complete on other SSDs. This ensures that at least one SSD will have a record of the data in flight until parity is consistent across all SSD's involved in a transaction.

At block 536, the redundancy engine determines if one or more SSDs were unable to respond to a request due to a failure. This may occur at any point in the process in which the redundancy engine is communicating with one of the SSDs. If so, at block 538, the redundancy engine module in the controller CPU examines the state of each SSD and the contents of its intent log. If data is missing, data may be recovered using RAID techniques. If the failure is a power loss, parity for data in flight as indicated by the intent logs in all of the SSDs may need to be recomputed.

At block 540, incomplete commands being tracked by the RNIC may be partially or completely retried by the RNIC or the host. The redundancy engine sequences recovery operations in the SSDs, RNICs, and to achieve as complete a recovery as possible based on the nature of the failure. A determination is made as to whether the recovery was successful at block 542. If the redundancy engine is not successful, in the recovery, at block 544, a response is returned to the host reporting the error condition.

At block 546, the acknowledgement allows the SSD to pass the correct data out of its data buffer to the indicated physical location in flash, and to remove the intent record from the intent log. The SSD may remove the host LBA from its cache, for example, is space is needed for further transactions. Note that there is benefit in retaining the cached LBA as subsequent read transactions can complete more quickly if it is retained.

Figure 5C:
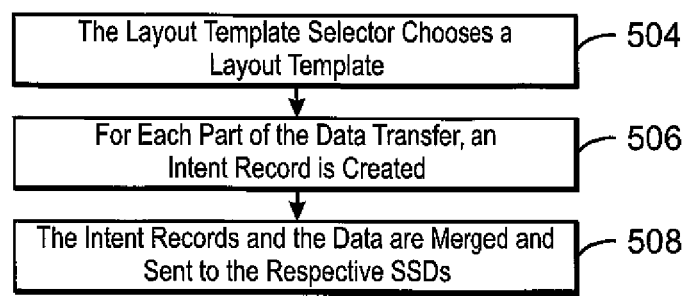
FIG. 5C is a process flow diagram of an example method for the optimistic storage of data.

FIG. 5C is a process flow diagram of an example method for the optimistic storage of data. Like numbered items are as described with respect to FIGS. 5A and 5B. The system is not limited to having all of the blocks shown in FIGS. 5A and 56, but may have fewer blocks, as shown with respect to FIG. 4C.

Figure 6:
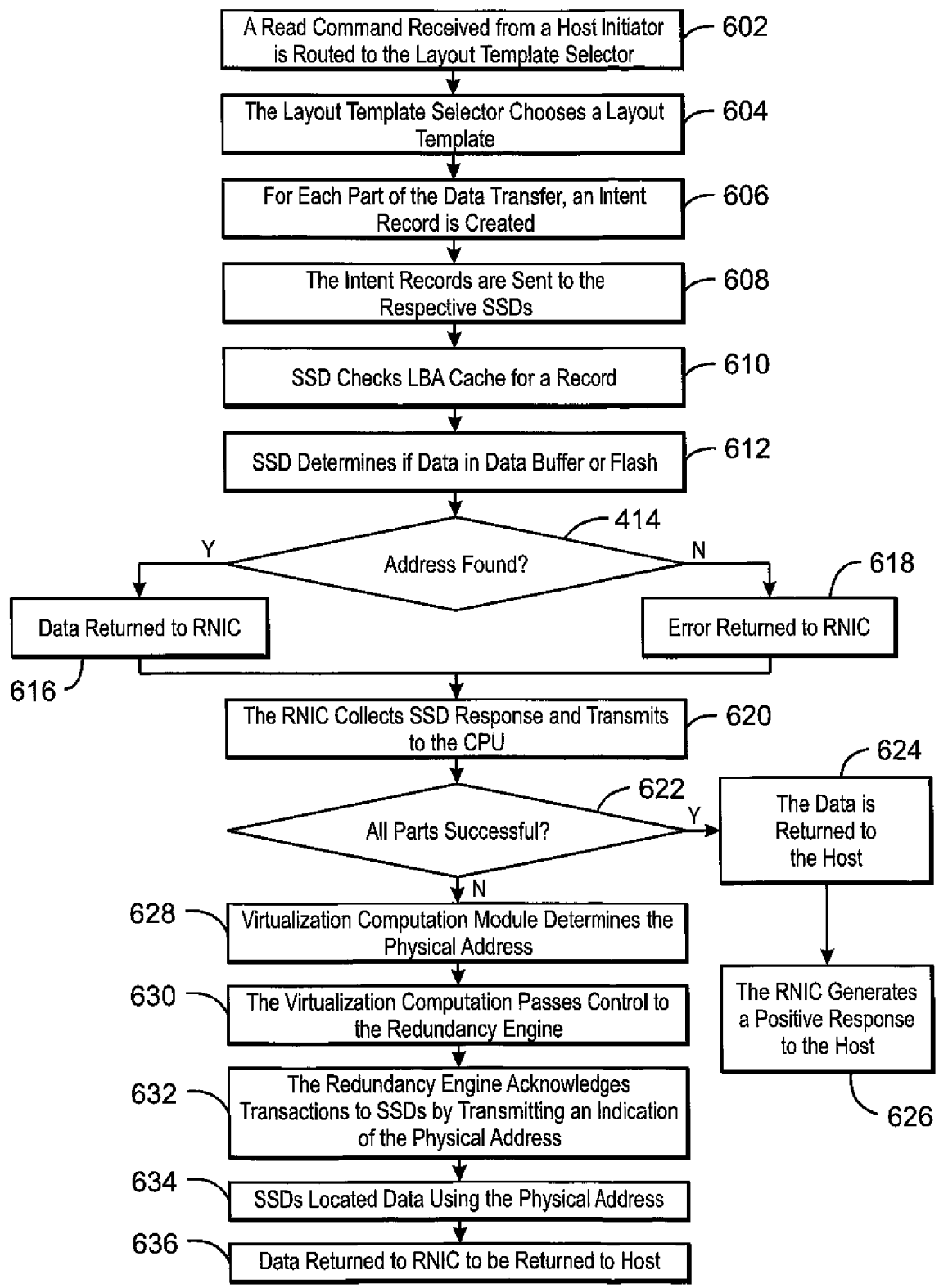
FIG. 6 is a process flow diagram of an example method 600 for reading from an optimistic SSD storage appliance

FIG. 6 is a process flow diagram of an example method 600 for reading from an optimistic SSD storage appliance. At block 602, a read received from a host initiator is routed to the layout template selector and staged for transmission to the controller CPU. At block 604, the layout selector performs a function on the volume and LBA in the command in order to choose a layout for locating the data for the command. The function may be a hash function or a masking and shifting function to convert the volume and address into a layout number. The layout associated with the layout number indicates which SSDs may be associated with each part of the data storage.

At block 606, for each part of the data transfer, an intent record with a unique identifier is created describing that part. The intent record includes the original host address and length of that part and the role the SSD is to play in the data transfer as specified by the layout. The intent record is also staged for transmission to the controller CPU.

At block 608, the intent record for each part is sent to the respective SSD. In some examples, this may be part of a read command to the SSD. At block 610, an SSD receives the intent record and each SSD checks its LBA cache for a record of the host LBA. At block 612, the SSD determines if the intent record refers to a region of either the data buffer or the flash. If at block 614, the address is found, then at block 616, the data is returned in response to the read and transmitted to the RNIC. If not, at block 618, the SSD responds to the RNIC indicating that the transaction could not yet be fulfilled.

At block 620, the responses of all SSDs are gathered by the RNIC. At this point the command, intent record and state information indicating the result are transmitted to the controller CPU. At block 622, the RNIC determines if all parts were successful, e.g., no errors or unfulfilled transactions occurred. If so, at block 624, then the data is sent to the host and, at block 626, the RNIC generates a positive response to the host indicating completion of the transaction. As the data is sent using a remote direct access memory (RDMA) protocol, the responses may be sent incrementally as SSDs locate the data. The response is then closed, e.g., indicated as final, when a positive response is sent to the host. In the event of an error or unfulfilled transaction the RNIC waits for the controller CPU to intervene before responding to the host.

At block 628, the virtualization computation module in the controller CPU receives the command, intent record, and state information and determines the correct physical addresses for all the parts of the data on all of the SSDs. After determining physical addresses for the data, at block 630, the virtualization computation passes control to the redundancy engine.

At block 632, the redundancy engine acknowledges transactions to SSDs by transmitting an indication of the physical address for each part of a transaction to the SSD responsible for that part. At block 634, the physical address allows any SSDs that were unable to complete the read to locate their data. At block 636, the data is then returned to the host.

Failure recovery on read transactions works in a similar fashion to write transactions, e.g., as discussed with respect to blocks 538-544 of FIG. 5B. For example, the redundancy engine module in the controller CPU examines the state of each SSD and the contents of its intent log. If data is missing, data may be recovered using RAID techniques.

Figure 7A:
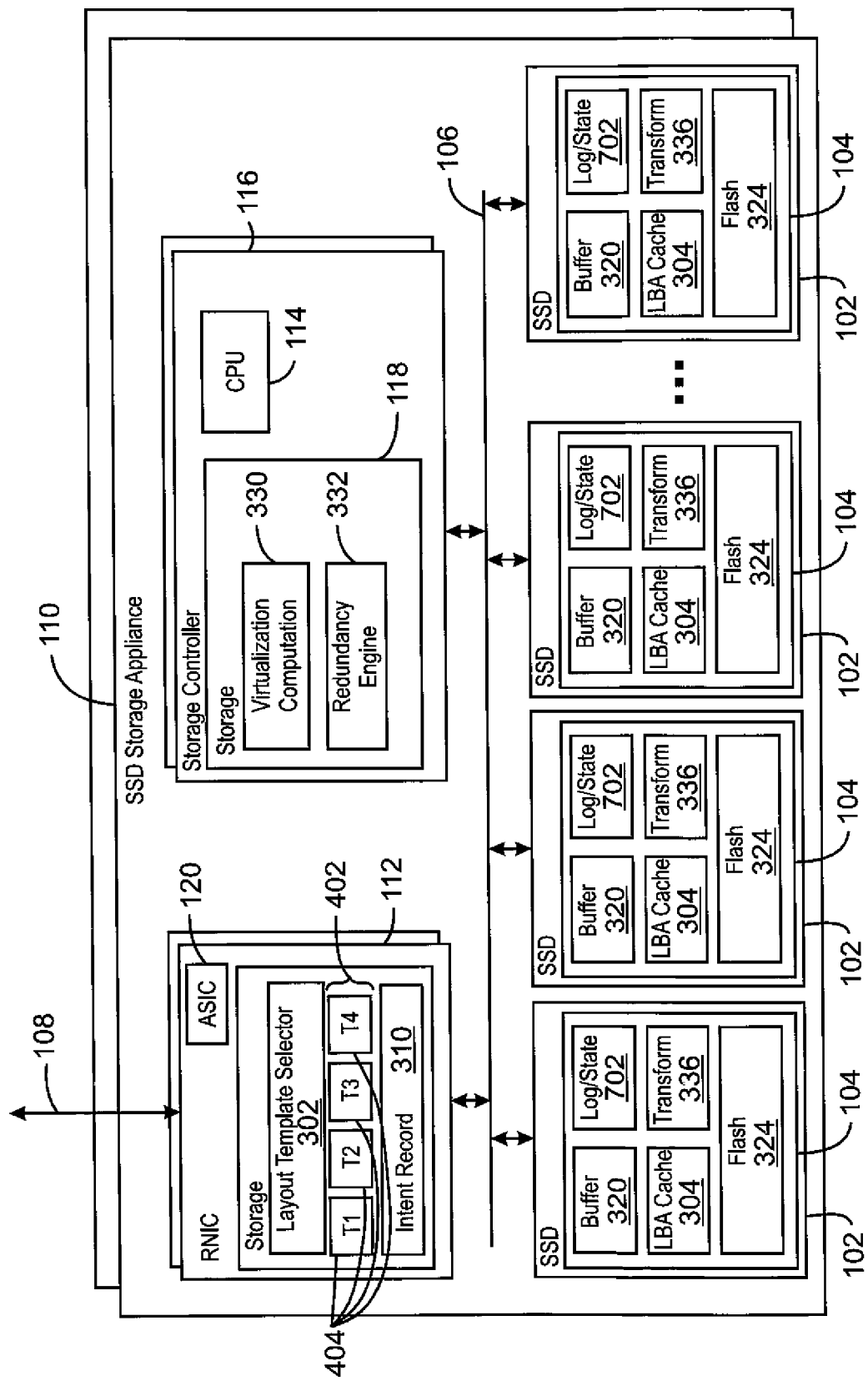
FIG. 7A is block diagram of an example optimistic storage appliance with robust redundancy.

FIG. 7A is block diagram of an example optimistic storage appliance 700 with robust redundancy. Like numbers are as described with respect to FIGS. 1, 3, and 4. In this example, for robust redundancy, the intent log storage adds an intent state, giving a combined intent/state log 702. As described herein, the intent state may depend on whether an SSD is a master or slave drive. For a drive functioning as a slave, an "in-flight" status indicates data that is in the process of being written, but may not be consistent across all SSDs. Another state for slave drives may be termed "multi-version" and indicates that both the old version of the data the new version are to be retained.

The states for a master SSD 102 also include the in-flight status used for the slave SSDs. The master SSD 102 has an additional state termed "mirrored". In the mirrored state, the data across all of the SSDs is consistent and redundant (mirrored), but additional redundancy, e.g., parity calculations, erasure code calculations, and the like, are still in progress. Once the redundancy calculations are completed, the intent state for the master can be changed to "committed". The committed state represents the commit form of the redundancy, and is the point at which all other SSDs may be released to flush the new data from the data buffer to the flash. All states may then be changed to be "untracked", as no data is in flight and parity calculations are complete.

Figure 7B:
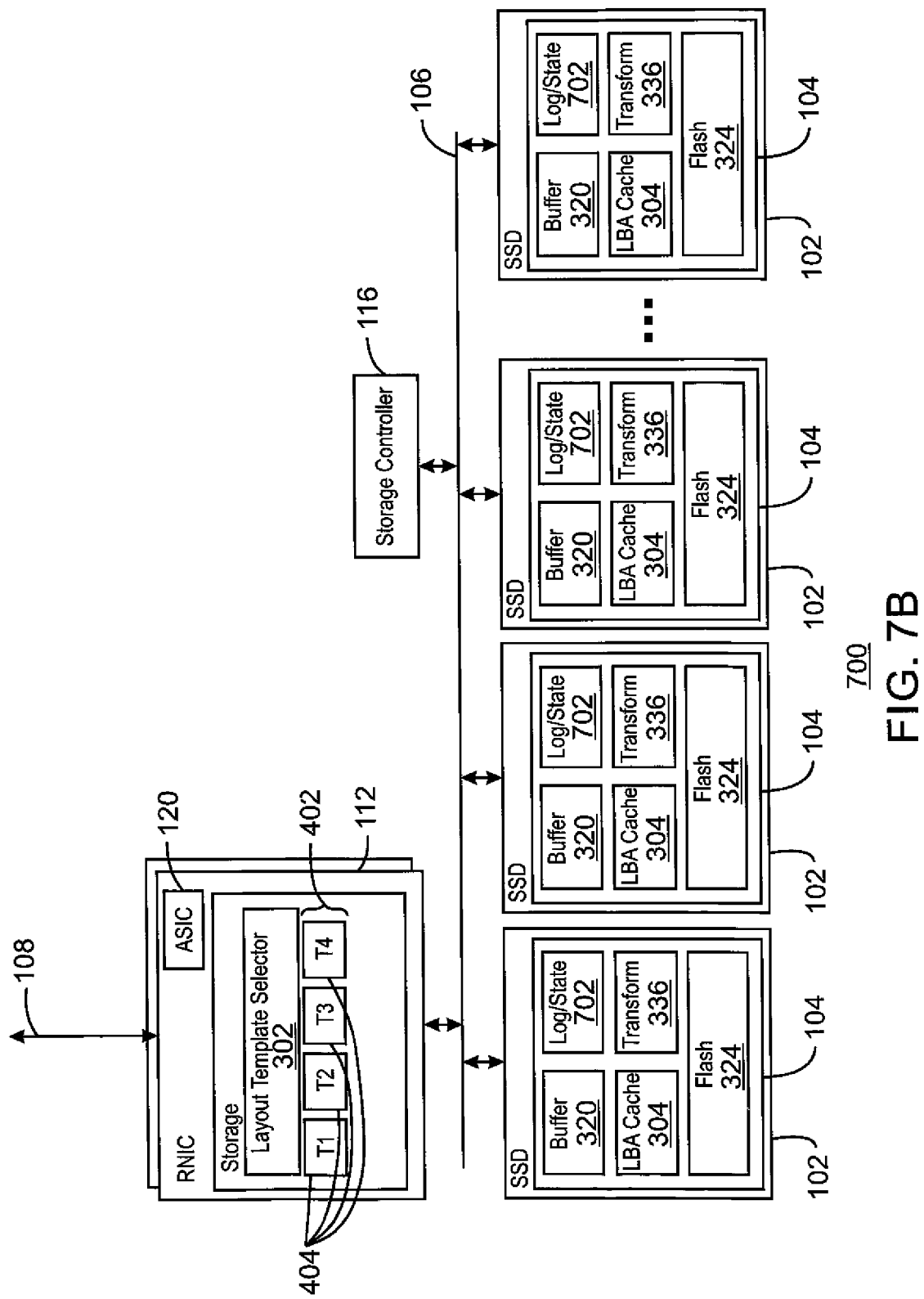
FIG. 7B is block diagram of an example optimistic storage appliance with robust redundancy.

FIG. 7B is block diagram of an example optimistic storage appliance with robust redundancy. Like numbered items are as described with respect to FIGS. 1, 3, 4, and 7A. The system is not limited to having all of the blocks shown in FIG. 7A, but may have fewer blocks, as shown with respect to FIG. 7B.

Figure 8A:
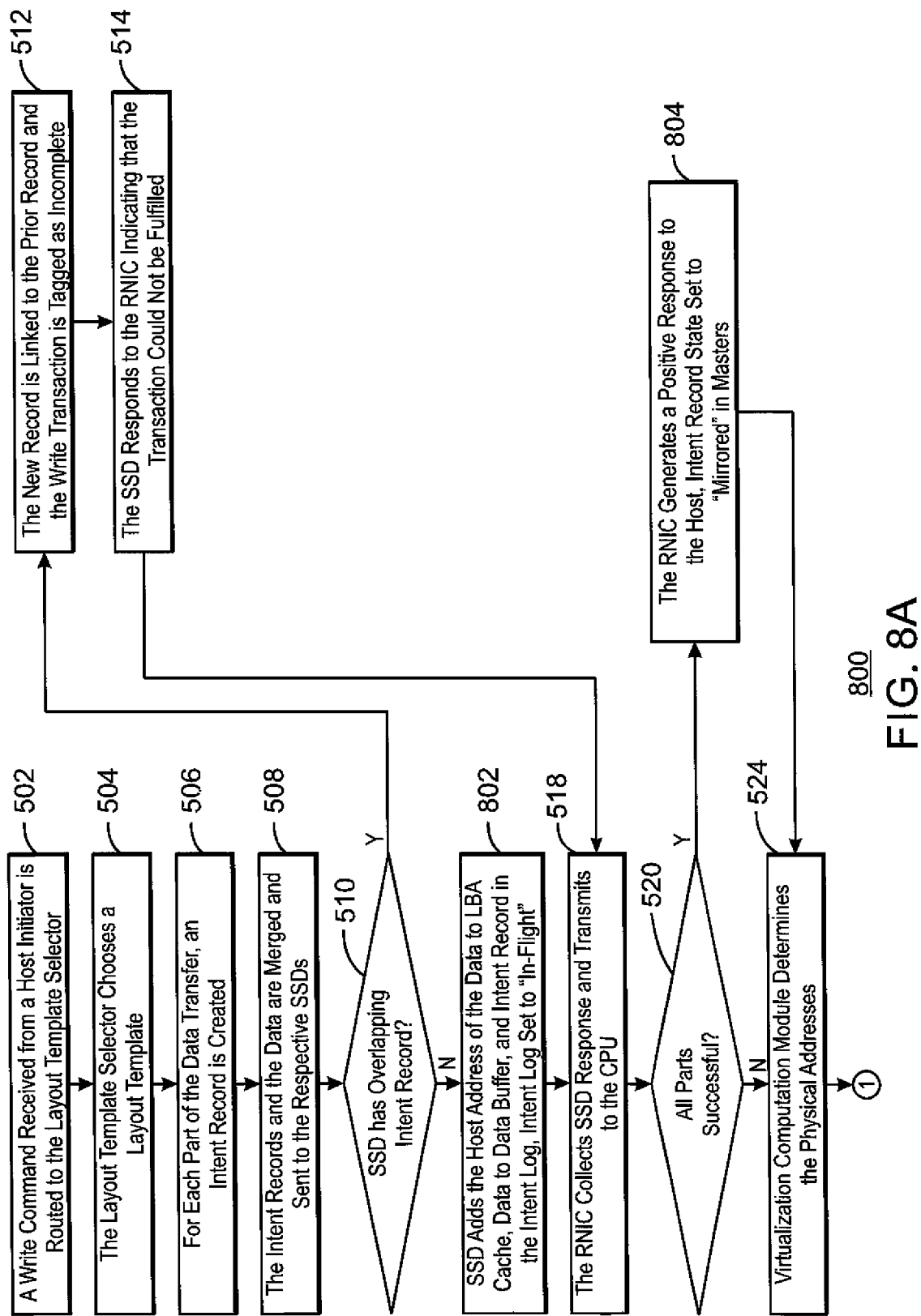
FIGS. 8A and 8B are a process flow diagram of an example method for the optimistic storage of data with robust redundancy.
Figure 8B:
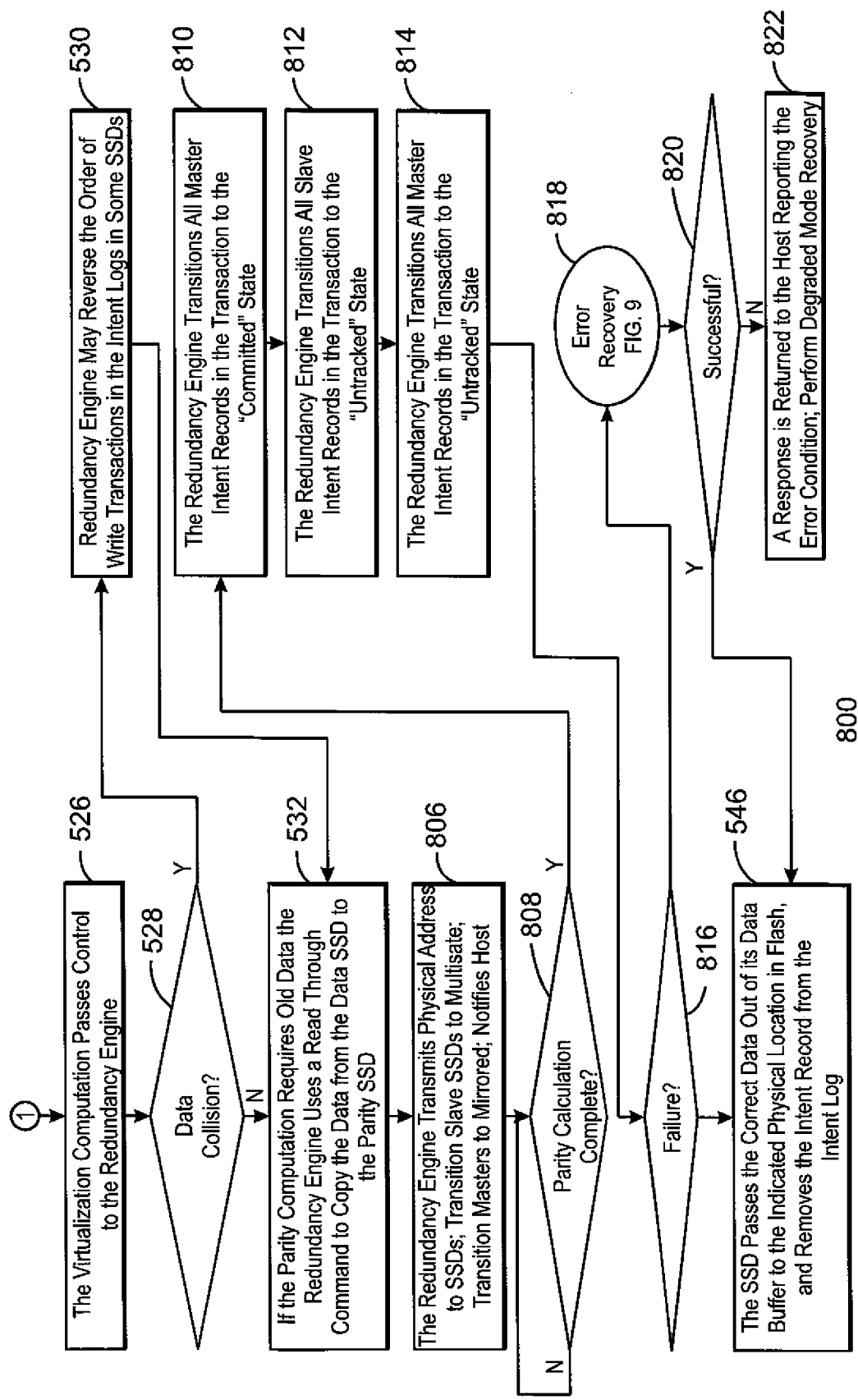

FIGS. 8A and 8B are a process flow diagram of an example method 800 for the optimistic storage of data with robust redundancy. The method 800 may be performed by the system of FIG. 7. Like numbered items are as described with respect to FIG. 5.

In contrast to the method of FIG. 5, at block 802, when the data is stored by the SSD in its data buffer, and the host LBA is cached, the intent record is placed in the SSDs intent log in the "In Flight" state. The transition to "in flight" occurs on both master and slave SSD's.

For any part of the transaction where all SSD responses indicated success the RNIC informs all layout masters that the part was successful. At block 802, the intent record state in the masters to transition to "mirrored". If all parts of the transaction on all SSDs were successful the RNIC responds to the host indicating success of the transaction, Regardless of success, when all SSD's have responded the smart RNIC sends the intent records and SSD responses to the virtualization computation module.

As described with respect to FIG. 5, the virtualization computation module assigns physical addresses then forwards control of the transaction to the redundancy engine. At block 806, the redundancy engine resolves write order conflicts and then delivers physical addresses to all of the SSDs. At the same time the intent logs in the slaves are transitioned to the multi-version state, and the masters are transitioned to the mirrored state if they were not there already. If no unresolved errors have been detected and the host has not been notified of successful completion of the transaction then the redundancy engine provides such notification via the RNIC at this point.

At block 808, the parity calculation is performed and the progress is tracked. The state indication of multi-version prevents data associated with intent log entries in the data buffer from overwriting older untracked data versions. If errors remain then the failure recovery algorithms in the redundancy engine take over using techniques such as when RAID or erasure coded media is fronted by a mirrored write back cache, as described herein. The redundancy engine, or the transformation module in a master SSD, calculates RAID or erasure code parity blocks using old and new versions of the data retained in the SSDs. Old parity blocks are not overwritten at this point. Instead new parity blocks are retained in data buffers.

Once all parity modifications are complete and placed in data buffers, at block 810, the redundancy engine transitions all master intent records in the transaction to the committed state. After all masters have transitioned, at block 812, the redundancy engine transitions the state of all slave intent records in the transaction to the untracked state. After the slave records are untracked, at block 814, the redundancy engine transitions the master records to untracked as well.

At block 816, a determination is made as to whether any remaining errors occurred. This may be made at any point during the process, for example, due to a power failure, an SSD failure, or both. If no errors have occurred, and all of the data involved in the transaction is now untracked, at block 546, the corresponding data in the data buffers may be flushed to flash to replace the old version of the data in the SSD. If any errors have occurred, at block 818, process flow may proceed to the process in FIG. 9 for error recovery. If the recovery process of FIG. 9 is successful, at block 820, process flow returns to block 546, If not, process flow proceeds to block 822 to report the error to the host, and implement degraded mode recovery, if available.

Figure 8C:
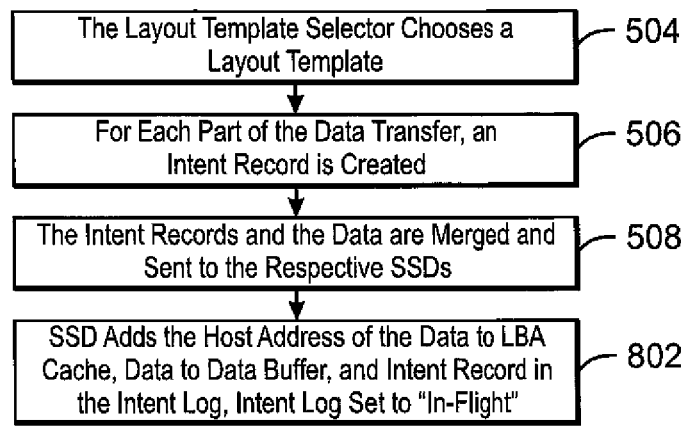
FIG. 8C is a process flow diagram of an example method for the optimistic storage of data with robust redundancy.

FIG. 8C is a process flow diagram of an example method for the optimistic storage of data with robust redundancy. The method 800 may be performed by the system of FIGS. 7A and 7B. Like numbered items are as described with respect to FIGS. 5 and 8A. The system is not limited to having all of the blocks shown in FIGS. 8A and 8B, but may have fewer blocks, as shown with respect to FIG. 8C.

Figure 9:
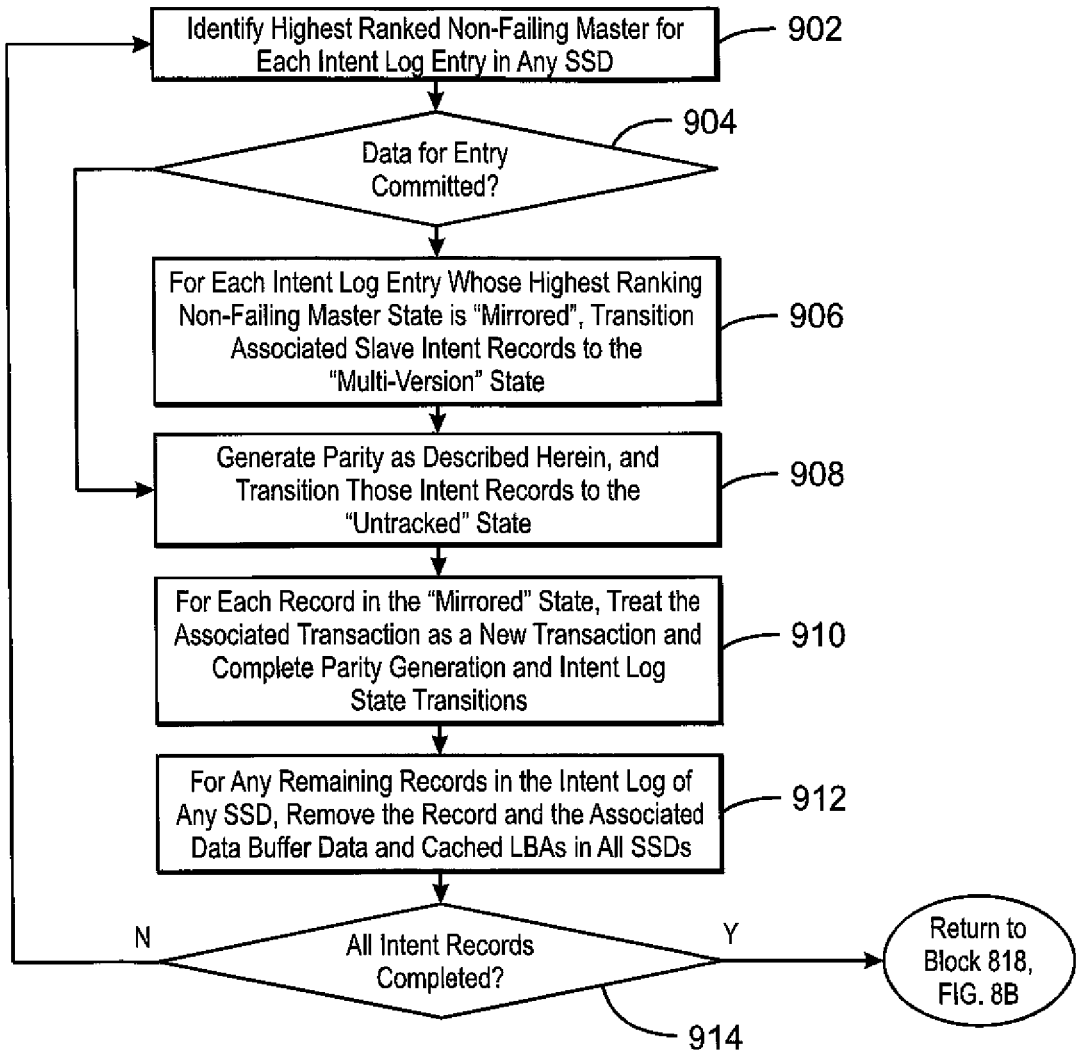
FIG. 9 is a process flow diagram of an example method 900 for recovering data from the multiple state SSDs.

FIG. 9 is a process flow diagram of an example method 900 for recovering data from the multiple state SSDs. The multi-version state ensures that data on SSDs that were not modified by a transaction and which share parity with data that were modified by the transaction can be recovered in the event of a failure during the transaction. As described herein, the buffers and intent logs are non-volatile so that recovery from stable versions of data can be achieved even if a failure occurs during power loss. In this example, recovery from power loss proceeds as follows once all non-failing SSDs are accessible.

The method 900 begins at block 902, with the identification of the highest ranked non-failing master for each intent log entry in any SSD. At block 904, for each record whose state in that master is "committed" process flow proceeds to block 910.

At block 906, each intent log entry whose highest ranking non-failing master state is "mirrored", has associated slave intent records transitioned to the "multi-version" state. At block 908, the generation of parity is performed as described herein, Those intent records are then transitioned to the "untracked" state described herein.

At block 910, the transaction for each record in the "mirrored" state is treated similarly to a new transaction from the host. Parity generation and intent log state transitions as performed as described above, with the exception that no interaction with the host occurs. At block 912, any remaining records in the intent log of any SSD are removed, along with the associated data in the data buffer and cached LBAs in all SSDs. If at block 914, it is determined that all records are complete, process flow returns to block 818 of FIG. 8B.

The state of the system may be recovered and ready to resume normal operation. If additional failures occur any time during or before the recovery process, data associated with intent records in the mirrored and multi-version states are used to affect degraded mode recovery.

The optimistic SSD appliance described with respect to FIGS. 5-9 has minimal changes to the read function from those discussed with respect to FIGS. 6A and 6B. If a read comes through while the status is "in-flight", the old data on the flash, e.g., in the "untracked" state, is returned to the host. If the state had changed to "multi-version" on the slave drives or "mirrored" on the master drive, the new data is returned from the data buffer.

Figure 10A:
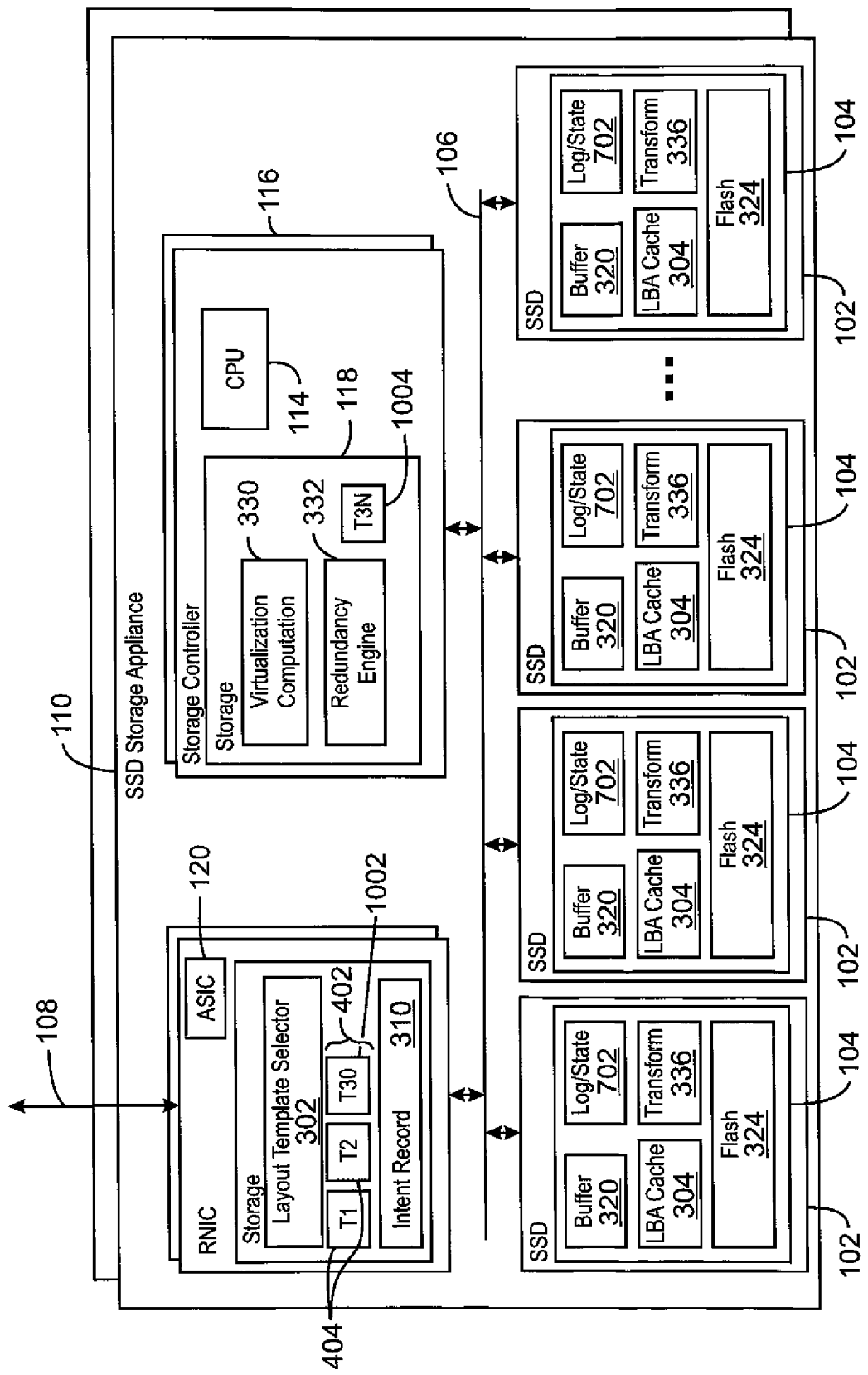
FIG. 10A is a block diagram of an example optimistic storage appliance with a dynamic layout.

FIG. 10A is a block diagram of an example optimistic storage appliance 1000 with a dynamic layout. Like numbered items are as discussed with respect to the previous figures. In the base example for optimistic direct access, discussed with respect to FIGS. 4-6, a layout change may cause a potentially extended period of intervention by the controller CPU before transactions can complete. The dynamic data placement example may resolve that problem using methods in the virtualization computation module to correct data placement after the transaction has completed optimistically from the host point of view. This allows an optimistic transaction completion to proceed normally in spite of any layout change so long as the layout initially used for the transaction does not run into any hardware errors.

It can be noted that the example shown in FIG. 10 includes the Intent Log and State 702 described with respect to FIGS. 7-9. However, it may be implemented on the basic appliance described with respect to FIGS. 4-6.

In this example, multiple layout templates are used for the same data, e.g., T3O 1002 and T3N 1004. The first, T3O 1002 is an initial or old layout template used by the RNIC for a given transaction. The second, T3N 1004 is a new layout template that is initially under the control of the CPU 114 in the controller 116. Although it is shown located in the storage 118 of the controller 116, the new layout template, T3N 1004 may be located in the RNIC 112. The initial layout template T3O 1002 is treated as a cache for data that is on its way into a different layout.

Figure 10B:
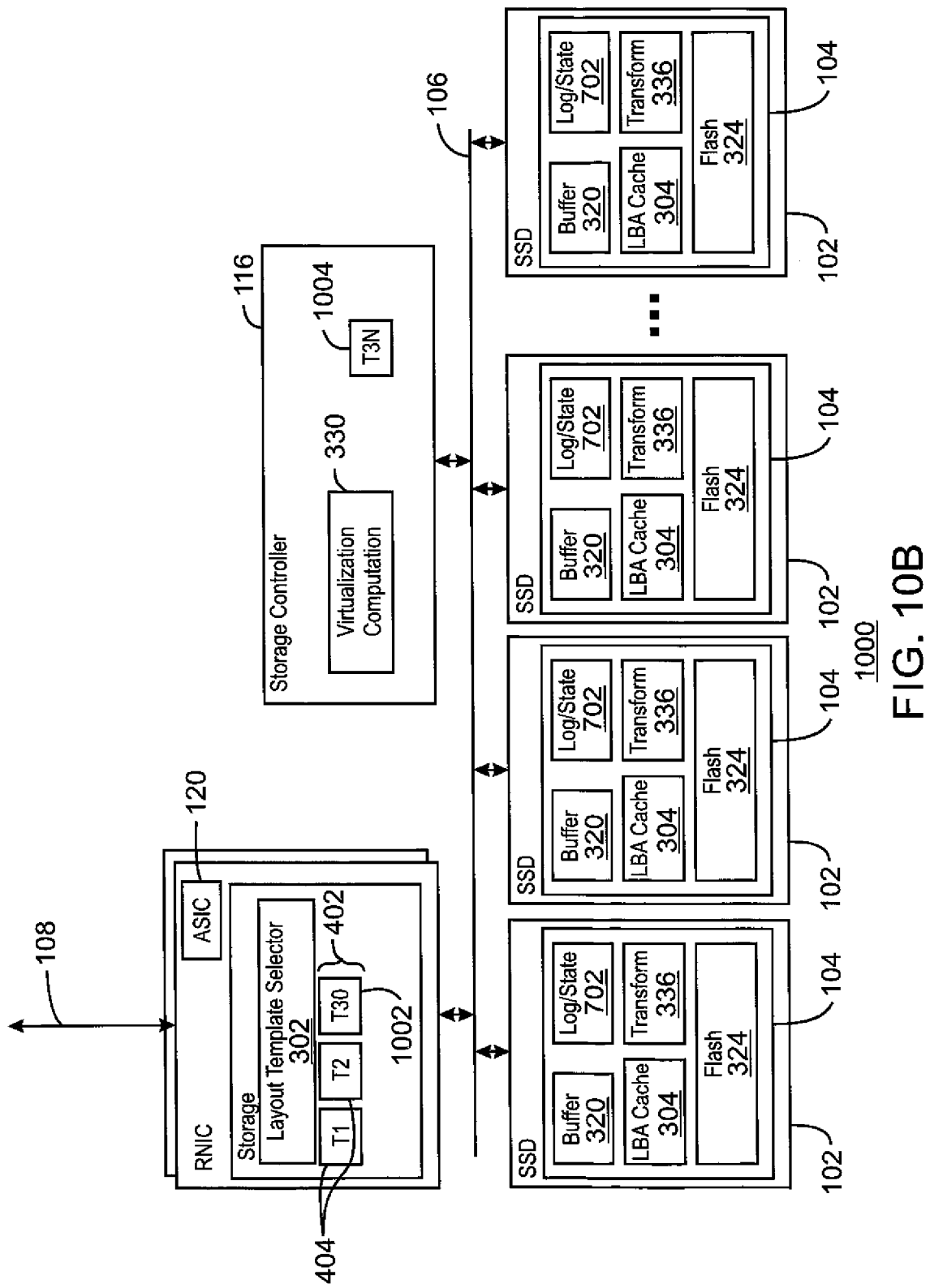
FIG. 10B is a block diagram of an example optimistic storage appliance with a dynamic layout.

FIG. 10B is a block diagram of an example optimistic storage appliance with a dynamic layout. Like numbered items are as discussed with respect to the previous figures. The system is not limited to having all of the blocks shown in FIG. 10A, but may have fewer blocks, as shown with respect to FIG. 10B.

Figure 11A:
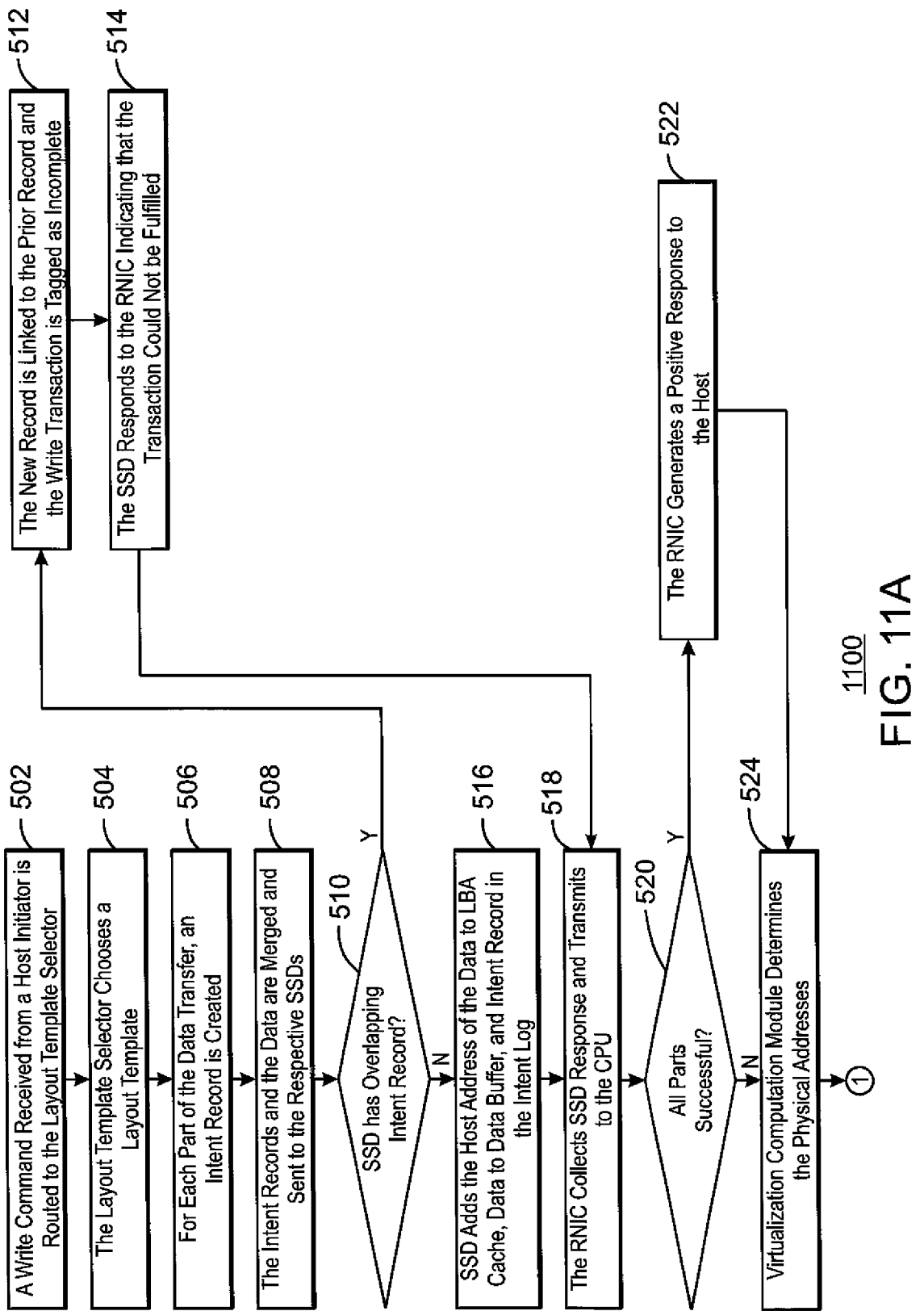
FIGS. 11A and 11B are a process flow diagram of an example method for the optimistic storage of data with a dynamic layout.

FIGS. 11A and B are a process flow diagram of an example method 1100 for the optimistic storage of data with a dynamic layout. Like numbered blocks are as described with respect to FIG. 5. According to this example, the initial progress of a transaction proceeds normally using the template that was selected by the RNIC when the transaction arrived, e.g., T3O 1002 of FIG. 10. The transaction proceeds up to the point where the virtualization computation module gets control, e.g., following blocks 502-522. At that point the CPU 114 continues to execute the base allocation up to the point where the transaction completes from the point of view of the host, if it is not already there.

At block 1102, the virtualization computation module determines whether the layout template used for the transaction matches the desired layout for the data. If so, process flow proceeds to block 526 to complete in the same manner it would have without dynamic layout.

If not, for write transactions, at block 1104, the data in the SSDs for the transaction is treated as a non-volatile mirrored cache, Thus, when the virtualization computation module 330 has an alternate layout template, T3N 1004 for a data set, at block 1106 it proceeds to copy the mirrored data to mirrored locations in the new layout template, T3N 1004. At block 1108, the virtualization computation module 330 then calculates the physical addresses for the data in the new layout template at block 106 completes the original algorithm according to the new layout. For some period of time the data may be in data buffers in SSDs indicated by both layouts.

This example allows layout information to be added to or modified in the layout template selector at any time so long as any transaction chooses layouts from a consistent version of the selector tables. This may be accomplished by making updates to the layout templates atomic using techniques such as swing buffers.

Further, read transactions may be performed as if the data is saved entirely in the new layout. This may be performed by managing the SSDs in the old layout in such a way that they are unable to resolve the physical addresses for the new layout. For example, read transactions in this state are managed by forcibly invalidating the LBAs in SSD data caches that are not involved in the desired layout for that data. Invalidation occurs after each redirected transaction completes but before it is copied to SSDs in the new layout. Even though LBAs for those data are not in an SSD's cache the data may remain in the intent log and the data buffer of the SSD until they are successfully mirrored into the new layout.

The techniques described herein may be implemented in a hard coded system, or may be implemented in a non-transitory computer readable medium. The computer readable medium may include any combinations of memory, such as RAM, static RAM, or NV memory, or hard drives.

Figure 11B:
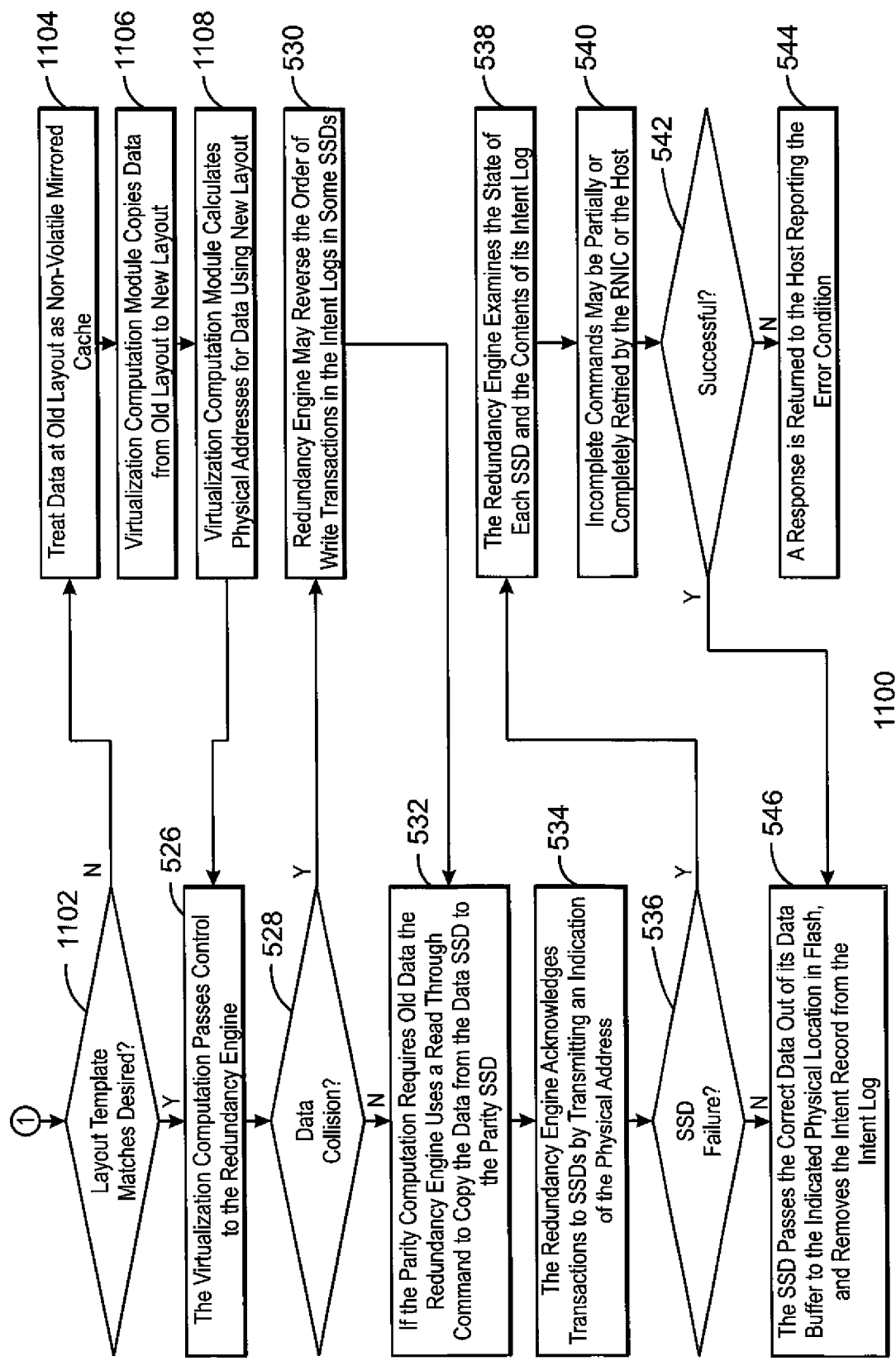
Figure 11C:
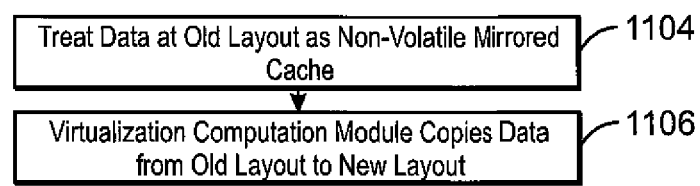
FIG. 11C is a process flow diagram of an example method for the optimistic storage of data with a dynamic layout.

FIG. 11C is a process flow diagram of an example method for the optimistic storage of data with a dynamic layout. Like numbered blocks are as described with respect to FIG. 11B. The system is not limited to having all of the blocks shown in FIGS. 8A and 8B, but may have fewer blocks, as shown with respect to FIG. 8C.

Figure 12:
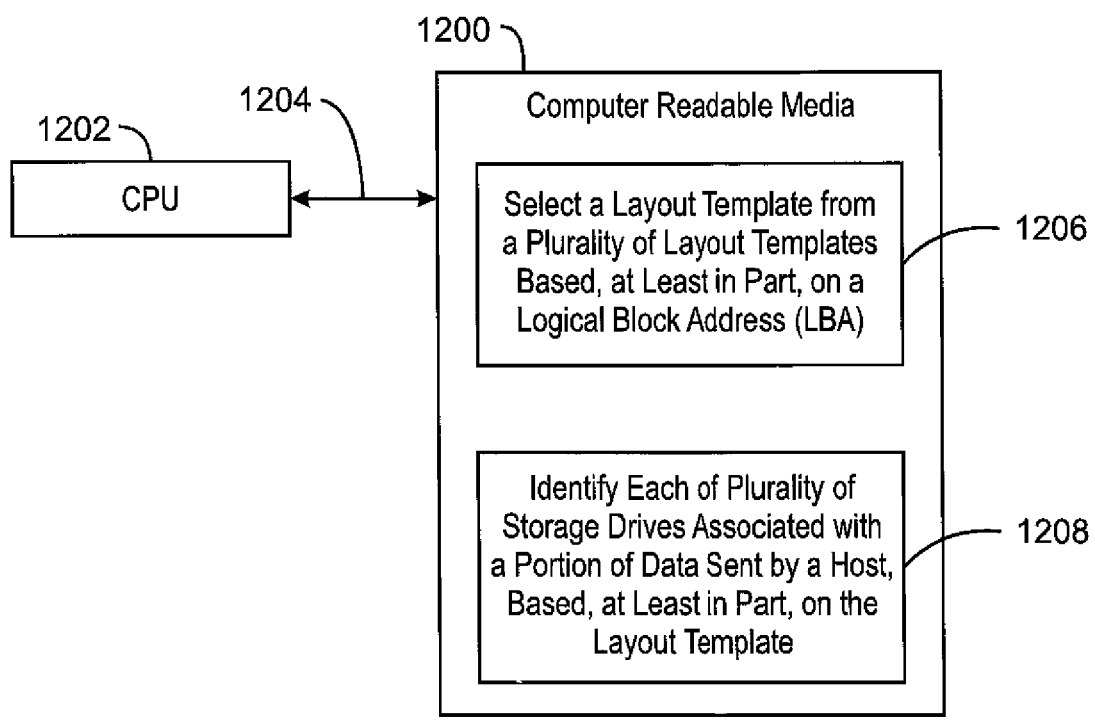
FIG. 12 is block diagram of an example non-volatile computer readable medium that includes code accessible by a processor over a bus.

FIG. 12 is block diagram of an example non-volatile computer readable medium 1200 that includes code accessible by a processor 1202 over a bus 1204. The code may include a code block 1206 to direct the processor 1202 to select a layout template from a plurality of layout templates based, at least in part, on a logical block address (LBA). A further code block 1208 may direct the processor 1202 to identify each of a plurality of storage drives associated with a portion of data sent by a host, based, at least in part, on the layout template.

Figure 13:
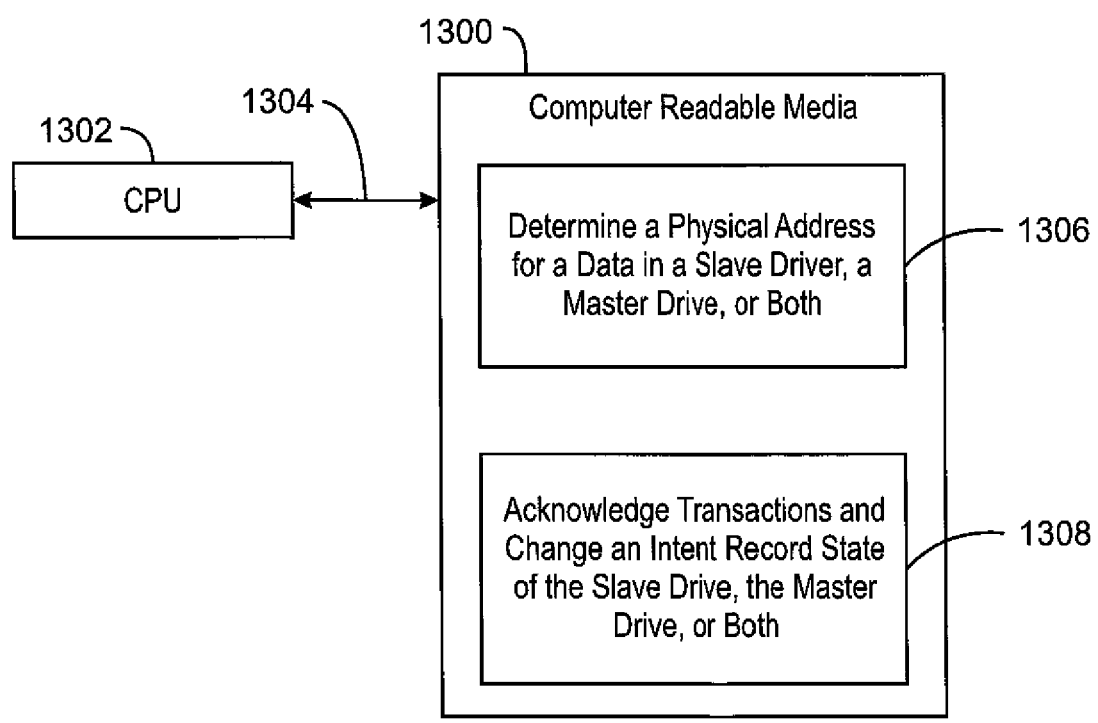
FIG. 13 is block diagram of an example non-volatile computer readable medium that includes code accessible by a processor over a bus.

FIG. 13 is block diagram of an example non-volatile computer readable medium 1300 that includes code accessible by a processor 1302 over a bus 1304. The code may include a code block 1306 to direct the processor 1302 to determine a physical address for a data in a slave drive, a master drive, or both. A further code block 1308 may direct the processor 1302 to acknowledge transactions and change an intent record state of the slave drive, the master drive, or both.

Figure 14:
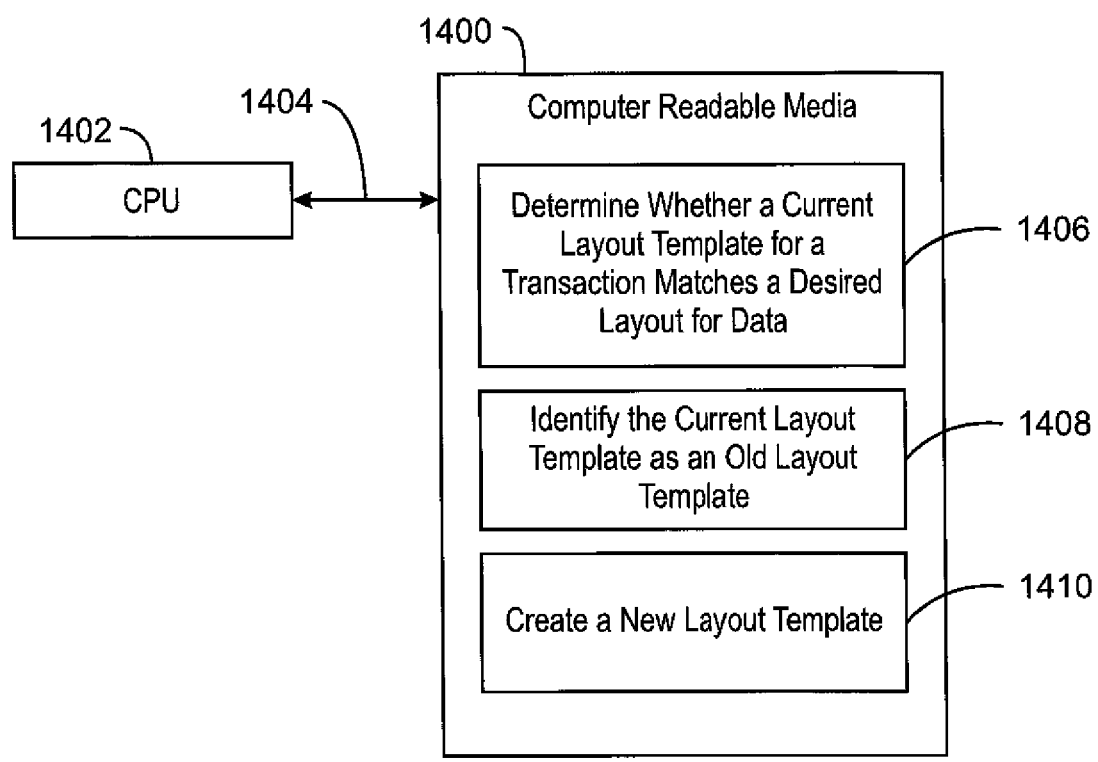
FIG. 14 is block diagram of an example non-volatile computer readable medium that includes code accessible by a processor over a bus.

FIG. 14 is block diagram of an example non-volatile computer readable medium 1400 that includes code accessible by a processor 1402 over a bus 1404. The code may include a code block 1406 to direct the processor 1402 to determine whether a current layout template for a transaction matches a desired layout for data. A further code block 1408 may direct the processor 1402 to identify the current layout template as an old layout template. A code block 1410 may also be included to direct the processor 1402 to create a new layout template.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the scope of the present techniques.

What is claimed is:

1. A system, comprising:
a plurality of storage drives;
a storage controller; and
an RNIC (remote direct memory access (RDMA) network interface card (NIC)) to communicate with the plurality of storage drives;
the RNIC comprising storage to store a plurality of different layout templates, each respective layout template of the plurality of different layout templates to specify a corresponding different placement of parts of data associated with a given transaction across respective storage drives of the plurality of storage drives, the RNIC to select a layout template from the plurality of different layout templates based, at least in part, on a logical block address (LBA) in a write transaction received from a host, wherein the selected layout template identifies which storage drives of the plurality of storage drives are associated with respective parts of new data associated with the write transaction;
wherein the RNIC is to provide the parts of the new data associated with the write transaction to the identified storage drives, respectively, and wherein the identified storage drives are to store the provided parts of the new data to respective data buffers of the identified storage drives;
wherein a respective intent log is provided to each of the identified storage drives, each respective intent log comprising a respective intent log entry state associated with the write transaction indicating whether old data to be overwritten and new data associated with the write transaction are to be maintained;
wherein the storage controller is to provide, to each of the identified storage drives, physical addresses on the identified storage drives for each of the parts of the new data associated with the write transaction; and
wherein each of the identified storage drives is to flush a respective part of the new data from its respective data buffer to a respective provided physical address of the identified storage drive based on its intent log entry state associated with the write transaction changing to an untracked state.

2. The system of claim 1, wherein a respective intent log entry state associated with the write transaction being a mirrored state indicates that parity calculations are in progress.

3. The system of claim 1, wherein a respective intent log entry state associated with the write transaction being an in-flight state indicates that the new data associated with the write transaction is in a process of being written.

4. The system of claim 3, wherein the system is not to return the new data in response to a read command from the host when the new data is associated with the in-flight state.

5. The system of claim 1, wherein a respective intent log entry state associated with the write transaction being a multi-version state indicates that both the old data to be overwritten and the new data associated with the write transaction are to be maintained.

6. The system of claim 5, wherein, when the old and new data is associated with the multi-version state, the system is to:
return the old data in response to a read through command from the host; and
return the new data in response to a read command from the host, the new data returned from one or more data buffers of one or more of the identified storage drives.

7. The system of claim 5, wherein, when the physical addresses are provided to the identified storage drives, the system is to store the multi-version state as the respective intent log entry state associated with the write transaction for each of the identified storage drives to store non-parity data of the new data.

8. The system of claim 1, wherein a respective intent log entry state of one of the identified storage drives having a mirrored state indicates that parity calculations are in progress.

9. The system of claim 8, wherein, when the physical addresses are provided to the identified storage drives, the system is to store the mirrored state as the respective intent log entry state associated with the write transaction for each of the identified storage drives to store new parity data of the new data.

10. The system of claim 1, wherein the untracked state indicates that no data is in flight for the write transaction and parity calculations are in complete.

11. A method comprising:
storing a plurality of different layout templates in storage of an RNIC (remote direct memory access (RDMA) network interface card (NIC)), each respective layout template of the plurality of different layout templates to specify a corresponding different placement of parts of data associated with a given transaction across respective storage drives of a plurality of storage drives in communication with the RNIC selecting, with the RNIC, a layout template from the plurality of different layout templates based, at least in part, on a logical block address (LBA) in a write transaction received from a host, wherein the selected layout template identifies which storage drives of the plurality of storage drives are associated with respective parts of new data associated with the write transaction, providing, to each of the identified storage drives, the respective parts of the new data associated with the write transaction and a respective intent log comprising a respective intent log entry state associated with the write transaction indicating whether old data to be overwritten and new data associated with the write transaction are to be maintained, the identified storage drives to store the provided parts of the new data to respective data buffers of the identified storage drives;

with a storage controller, providing, to each of the identified storage drives, physical addresses on the identified storage drives for each of the parts of the new data associated with the write transaction; and with the storage controller, transitioning the respective intent log entry state of each of the identified storage drives to an untracked state, the transitioning to the untracked state causing each of the identified storage drives to flush a respective part of the new data from its respective data buffer to a respective provided physical address of the identified storage drive.

12. The method of claim 11, comprising:
storing an in-flight state as the respective intent log entry state associated with the write transaction for each of the identified storage drives, when the new data is provided to the identified storage drives.

13. The method of claim 12, wherein the in-flight state indicates that the new data associated with the write transaction is in a process of being written.

14. The method of claim 12, wherein:
the mirrored state indicates that parity calculations are in progress; and the new data is not returned in response to a read command from the host when the new data is associated with the in-flight state.

15. The method of claim 12, comprising:
when the physical addresses are provided to the identified storage drives:
storing a multi-version state as the respective intent log entry state associated with the write transaction for each of the identified storage drives that is to store non-parity data of the new data; and
storing a mirrored state as the respective intent log entry state associated with the write transaction for each of the identified storage drives that is to store new parity data of the new data.

16. The method of claim 15, wherein the multi-version state indicates that both the old data to be overwritten and the new data associated with the write transaction are to be maintained.

17. The method of claim 15, wherein, when the old and new data is associated with the multi-version state:
returning the old data in response to a read through command from the host; and
returning the new data in response to a read command from the host, the new data returned from one or more data buffers of one or more of the identified storage drives.

18. The method of claim 15, comprising:
calculating the new parity data using the old data and the new data; and
storing the new parity data in one or more data buffers of one or more of the identified storage drives that are to store the new parity data of the new data.

19. The method of claim 18, comprising:
after the storing the new parity data, transitioning the respective intent log entry state associated with the write transaction to untracked for each of the identified storage drives.

* * * * *